US012265665B1

(12) United States Patent
Piuze-Phaneuf et al.

(10) Patent No.: US 12,265,665 B1
(45) Date of Patent: Apr. 1, 2025

(54) HEURISTIC FOR HAND TRACKING CORRECTION MODES

(71) Applicant: Apple Inc., Cupertino, CA (US)

(72) Inventors: Emmanuel Piuze-Phaneuf, Los Gatos, CA (US); Ali Ercan, San Jose, CA (US); Julian K. Shutzberg, San Francisco, CA (US); Paul A. Lacey, Davie, FL (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/371,098

(22) Filed: Sep. 21, 2023

Related U.S. Application Data

(60) Provisional application No. 63/409,315, filed on Sep. 23, 2022.

(51) Int. Cl.
  *G06F 3/01* (2006.01)
(52) U.S. Cl.
  CPC .............. *G06F 3/017* (2013.01); *G06F 3/011* (2013.01)
(58) Field of Classification Search
  CPC ................................. G06F 3/011; G06F 3/017
  USPC ........................................................ 345/156
  See application file for complete search history.

(56) References Cited

U.S. PATENT DOCUMENTS

| 10,706,584 | B1 | 7/2020 | Ye et al. |
| 11,443,558 | B2 * | 9/2022 | Wada ..................... G06V 40/19 |
| 2015/0154453 | A1 | 6/2015 | Wilf |
| 2018/0307319 | A1 * | 10/2018 | Karmon .............. G06V 40/113 |
| 2020/0226786 | A1 | 7/2020 | Fitzgibbon et al. |
| 2021/0090337 | A1 * | 3/2021 | Ravasz ................. G06T 19/006 |

* cited by examiner

*Primary Examiner* — Calvin C Ma
(74) *Attorney, Agent, or Firm* — Fernando & Partners, LLP

(57) ABSTRACT

In some implementations, a method includes: determining a location for virtual content; detecting a user interaction with the virtual content; in response to detecting the user interaction with the virtual content, determining a position of a hand gesture during the user interaction with the virtual content; in accordance with a determination that the position of the hand gesture is within a threshold distance relative to the location of the virtual content, generating corrected hand tracking data associated with the user interaction with the virtual content; and in accordance with a determination that the position of the hand gesture is outside of the threshold distance relative to the location of the virtual content, generating uncorrected hand tracking data associated with the user interaction with the virtual content.

20 Claims, 16 Drawing Sheets

HEURISTIC FOR HAND TRACKING CORRECTION MODES

CROSS-REFERENCE TO RELATED APPLICATIONS

This application is claims priority to U.S. Provisional Patent App. No. 63/409,315, filed on Sep. 23, 2022, which is hereby incorporated by reference in its entirety.

TECHNICAL FIELD

The present disclosure generally relates to hand tracking and, in particular, to systems, methods, and devices associated with a heuristic for hand tracking correction modes.

BACKGROUND

In various implementations, an extended reality (XR) environment is presented by a head-mounted device (HMD). Various HMDs include a scene camera that captures an image of the physical environment in which the user is present (e.g., a scene) and a display that displays the image to the user. In some instances, this image or portions thereof can be combined with one or more virtual objects to present the user with an XR experience. In other instances, the HMD can operate in a pass-through mode in which the image or portions thereof are presented to the user without the addition of virtual objects. Ideally, the image of the physical environment presented to the user is substantially similar to what the user would see if the HMD were not present. However, due to the different positions of the eyes, the display, and the camera in space, this may not occur, resulting in impaired distance perception, disorientation, and poor hand-eye coordination.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
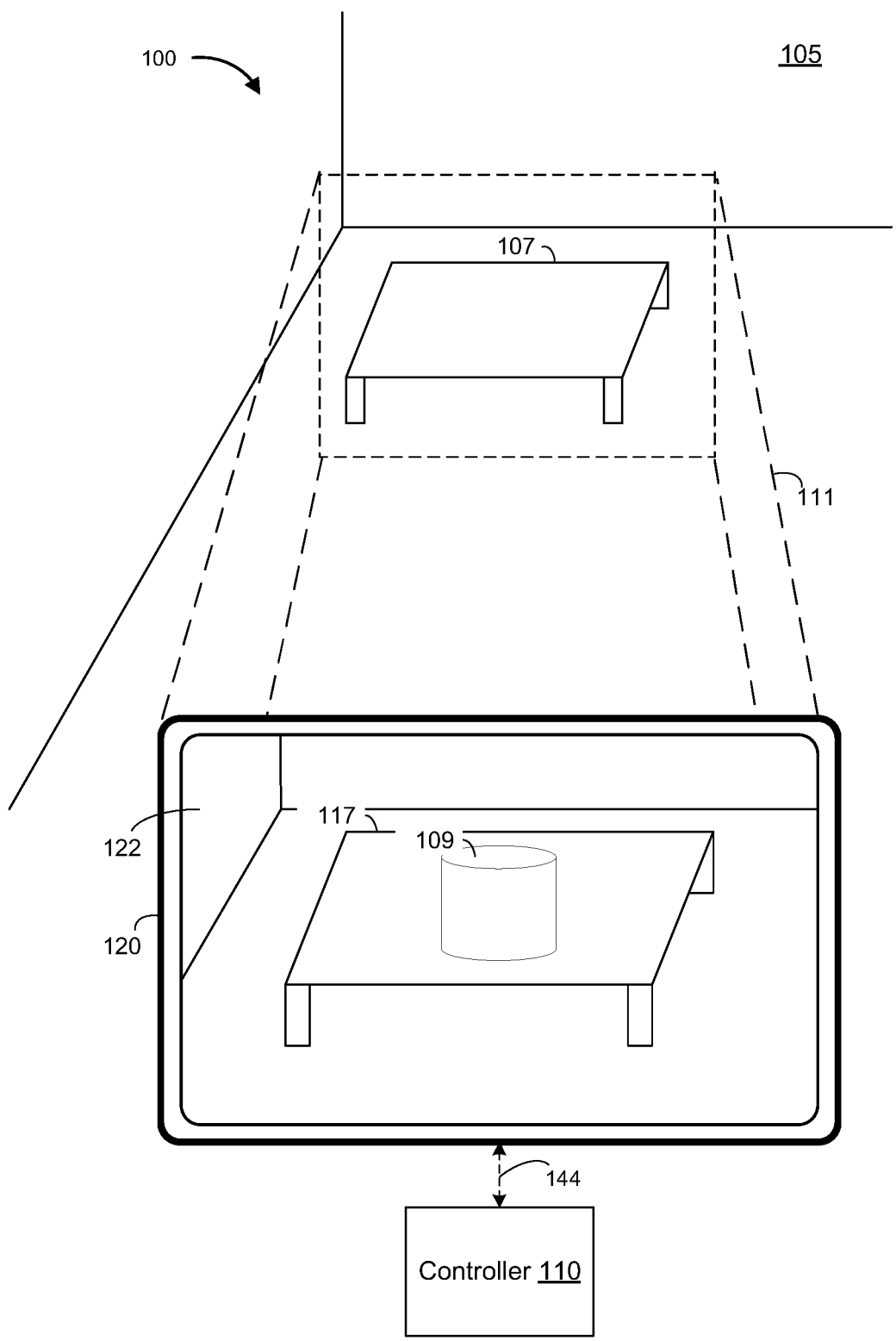
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for improved hand tracking. According to some implementations, the method is performed at a computing system including non-transitory memory and one or more processors, wherein the computing system is communicatively coupled to a display device and one or more input devices via a communication interface. The method includes: determining a location for virtual content; detecting a user interaction with the virtual content; in response to detecting the user interaction with the virtual content, determining a position of a hand gesture during the user interaction with the virtual content; in accordance with a determination that the position of the hand gesture is within a threshold distance relative to the location of the virtual content, generating corrected hand tracking data associated with the user interaction with the virtual content; and in accordance with a determination that the position of the hand gesture is outside of the threshold distance relative to the location of the virtual content, generating uncorrected hand tracking data associated with the user interaction with the virtual content.

In accordance with some implementations, an electronic device includes one or more displays, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more displays, one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As described above, in an HMD with a display and a scene camera, the image of the physical environment presented to the user on the display may not always reflect what the user would see if the HMD were not present due to the different positions of the eyes, the display, and the camera in space. In various circumstances, this results in poor distance perception, disorientation of the user, and poor hand-eye coordination, e.g., while interacting with the physical environment. Thus, in various implementations, images from the scene camera are transformed (e.g., point-of-view (POV) correction) such that they appear to have been captured at the location of the user's eyes using a depth map representing, for each pixel of the image, the distance from the camera to the object represented by the pixel. In various implementations, images from the scene camera are partially transformed (e.g., partial POV correction) such that they appear to have been captured at a location closer to the location of the user's eyes than the location of the scene camera.

In various implementations, the depth map is altered to reduce artifacts. For example, in various implementations, the depth map is smoothed so as to avoid holes in the transformed image. In various implementations, the depth map is clamped so as to reduce larger movements of the pixels during the transformation. In various implementations, the depth map is made static such that dynamic objects do not contribute to the depth map. For example, in various implementations, the depth map values at locations of a dynamic object are determined by interpolating the depth map using locations surrounding the locations of the dynamic object. In various implementations, the depth map values at locations of a dynamic object are determined based on depth map values determined at a time the dynamic object is not at the location. In various implementations, the depth map is determined using a three-dimensional model of the physical environment without dynamic objects. Using a static depth map may increase spatial artifacts, such as the objects not being displayed at their true locations. However, using a static depth map may reduce temporal artifacts, such as flickering.

To improve hand tracking and reduce resource consumption, the method described herein includes logic for transitioning between using temporally-differential smoothed POV corrected hand tracking data for direct interactions with virtual objects and uncorrected hand tracking data for indirect interactions with virtual objects.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience (sometimes also referred to herein as a "XR environment" or a "virtual environment" or a "graphical environment") for the user. In some implementations, the controller 110 includes a suitable combination of software, firmware, and/or hardware. The controller 110 is described in greater detail below with respect to FIG. 9. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120) via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content (sometimes also referred to herein as "graphical content" or "virtual content") to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display an XR object (e.g., an XR cylinder 109) and to enable video pass-through of the physical environment 105 (e.g., including a representation 117 of the table 107) on a display 122. The electronic device 120 is described in greater detail below with respect to FIG. 10.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
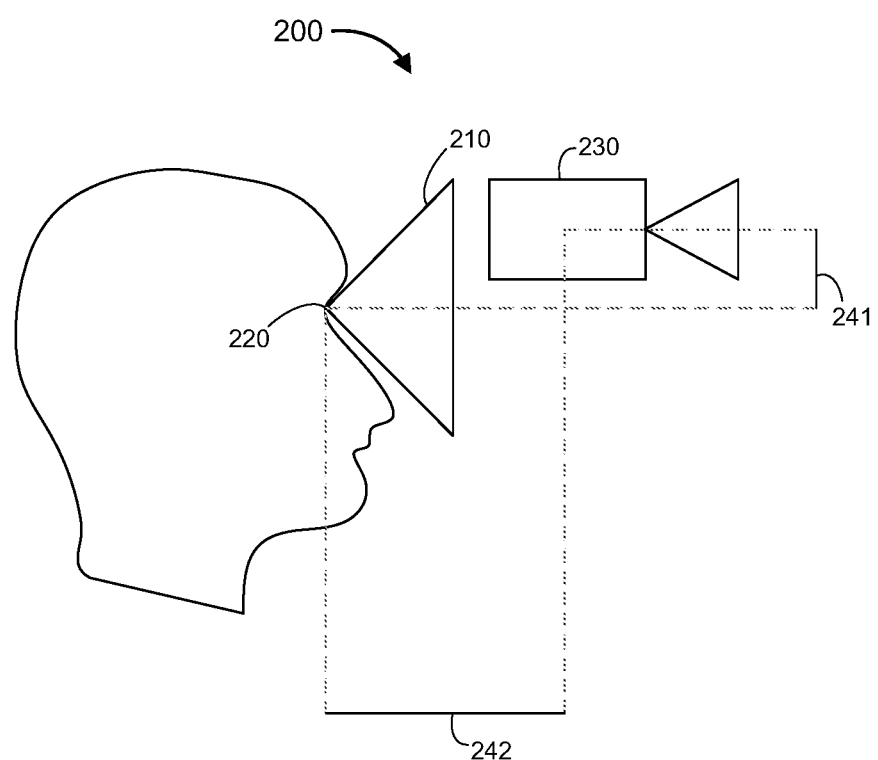
FIG. 2 illustrates an example scenario related to capturing an image of physical environment and displaying the captured image in accordance with some implementations.

FIG. 2 illustrates an example scenario 200 related to capturing an image of an environment and displaying the captured image in accordance with some implementations. A user wears a device (e.g., the electronic device 120 of FIG. 1) including a display 210 and an image sensor 230. The image sensor 230 captures an image of a physical environment and the display 210 displays the image of the physical environment to the eyes 220 of the user. The image sensor 230 has a perspective that is offset vertically from the perspective of the user (e.g., where the eyes 220 of the user are located) by a vertical offset 241. Further, the perspective of the image sensor 230 is offset longitudinally from the perspective of the user by a longitudinal offset 242. Further, in various implementations, the perspective of the image sensor 230 is offset laterally from the perspective of the user by a lateral offset (e.g., into or out of the page in FIG. 2).

Figure 3:
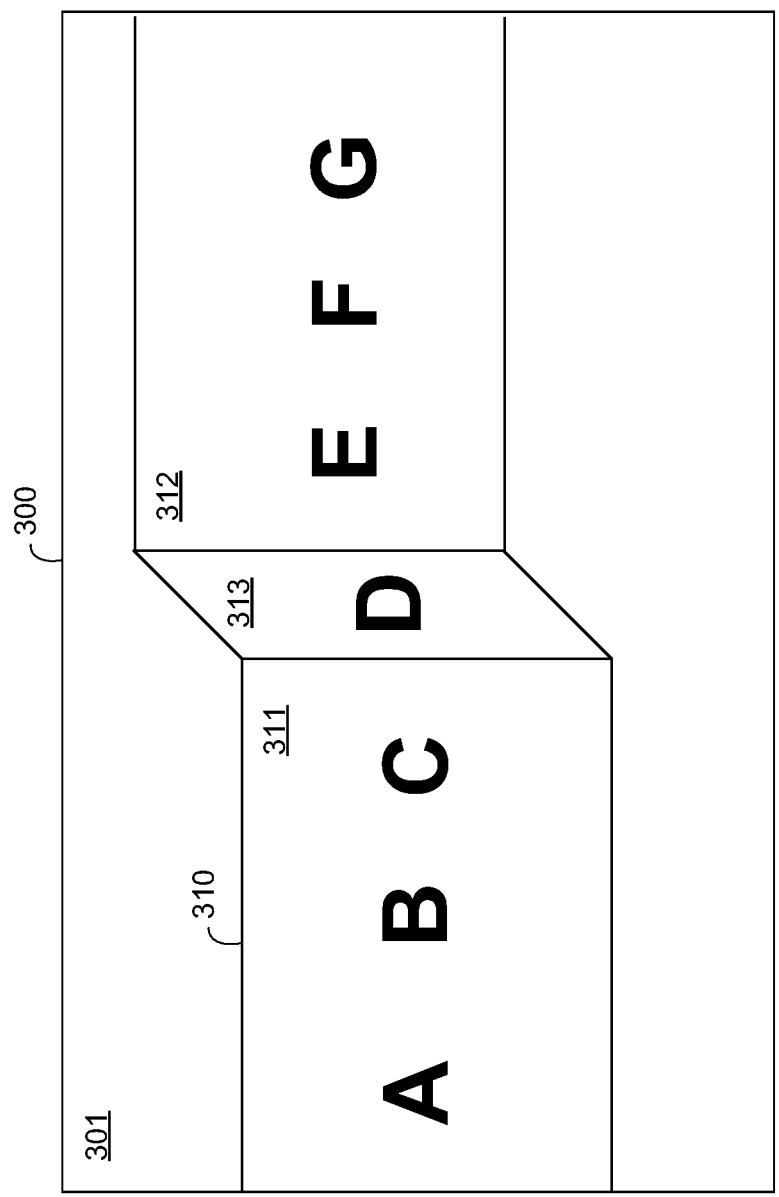
FIG. 3 is an image of physical environment captured by an image sensor from a particular perspective in accordance with some implementations.

FIG. 3 is an image 300 of a physical environment 301 captured by an image sensor from a particular perspective in accordance with some implementations. The physical environment 301 includes a structure 310 having a first surface 311 nearer to the image sensor, a second surface 312 further from the image sensor, and a third surface 313 connecting the first surface 311 and the second surface 312. The first surface 311 has the letters A, B, and C painted thereon, the third surface 313 has the letter D painted thereon, and the second surface 312 has the letters E, F, and G painted thereon.

From the particular perspective, the image 300 includes all of the letters painted on the structure 310. However, from other perspectives, a captured image may not include all the letters painted on the structure 310.

Figure 4:
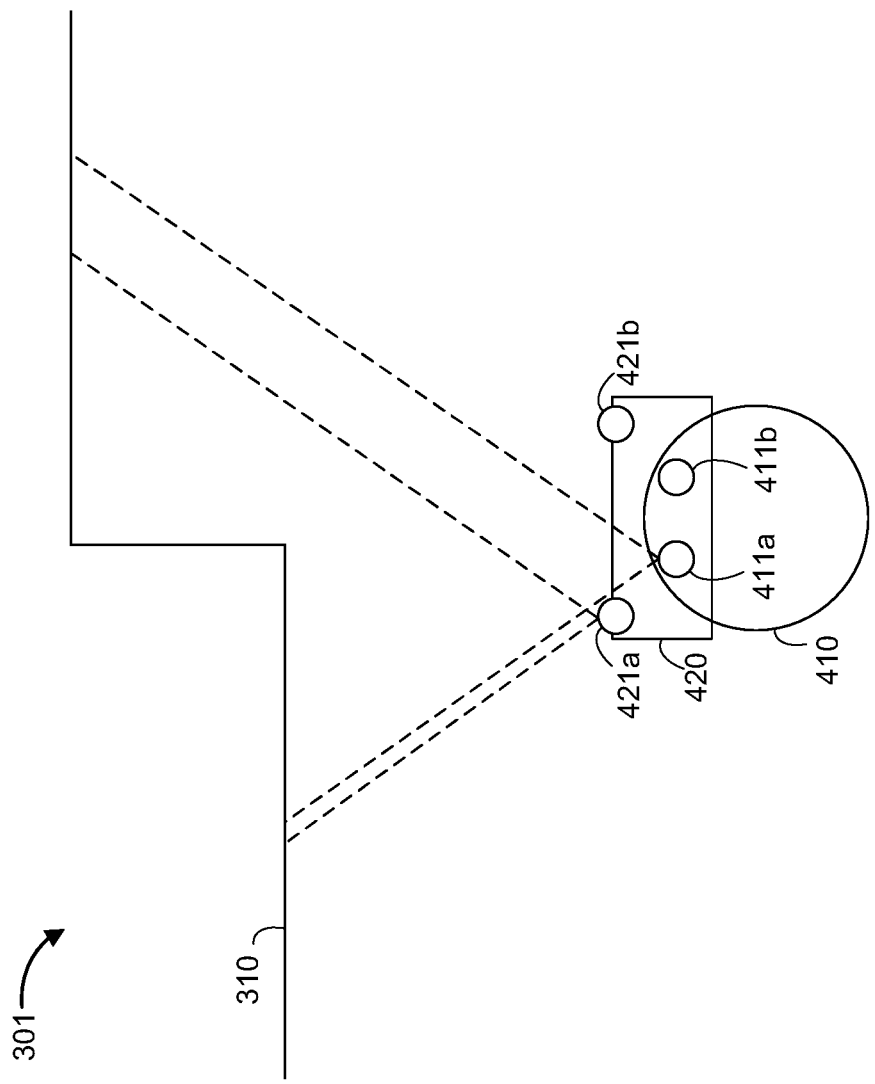
FIG. 4 is an overhead perspective view of the physical environment of FIG. 3 in accordance with some implementations.

FIG. 4 is an overhead perspective view of the physical environment 301 of FIG. 3 in accordance with some implementations. The physical environment 301 includes the structure 310 and a user 410 wearing an HMD 420 (e.g., the electronic device 120 in FIG. 1). The user 410 has a left eye 411a at a left eye location providing a left eye perspective. The user 410 has a right eye 411b at a right eye location providing a right eye perspective. The HMD 420 includes a left image sensor 421a at a left image sensor location providing a left image sensor perspective. The HMD 420 includes a right image sensor 421b at a right image sensor location providing a right image sensor perspective. Because the left eye 411a of the user 410 and the left image sensor 421a of the HMD 420 are at different locations, they each provide different perspectives of the physical environment.

Figure 5A:
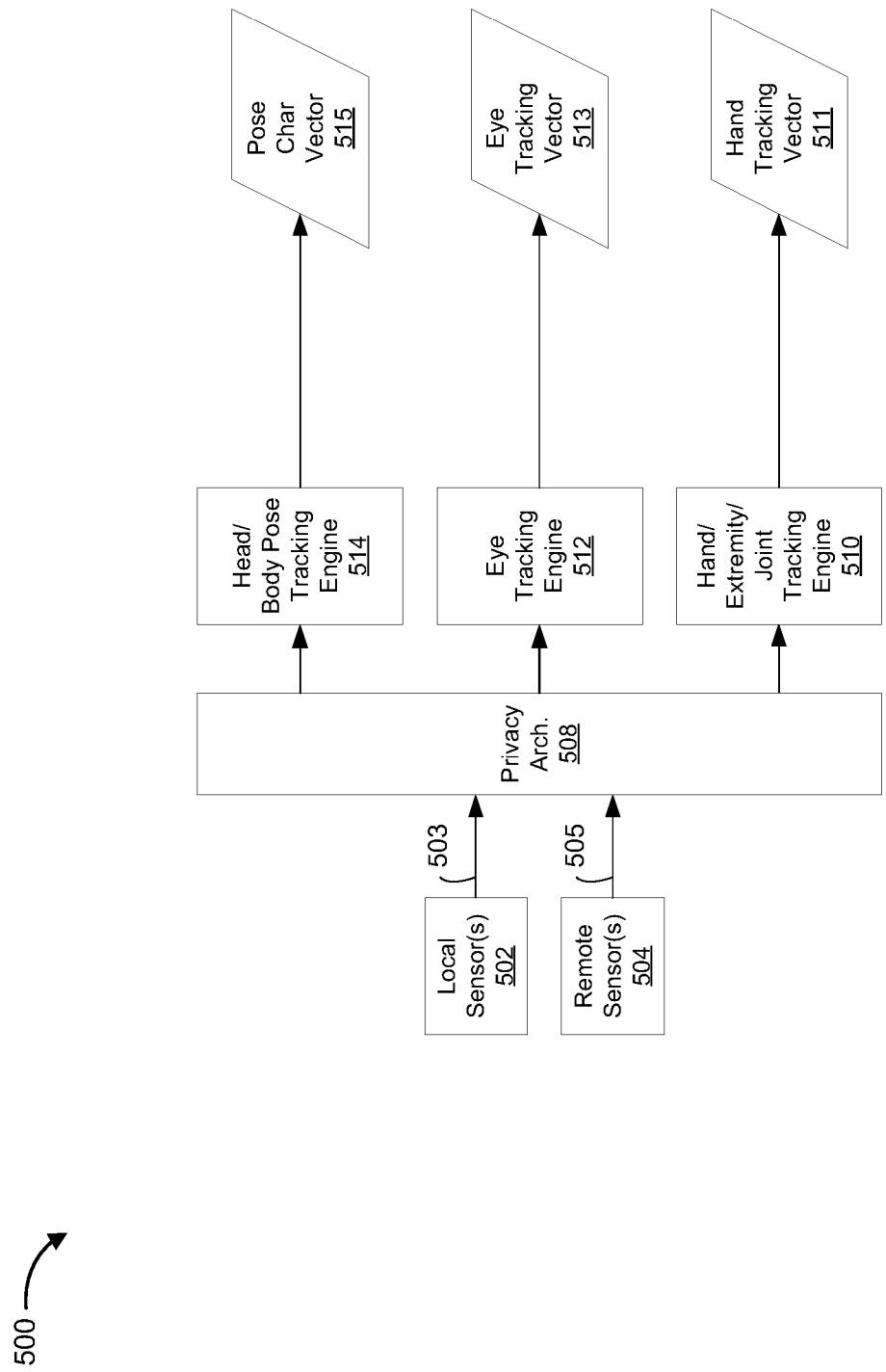
FIG. 5A is a block diagram of an example input tracking architecture in accordance with some implementations.

FIG. 5A is a block diagram of an input tracking architecture 500 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the input tracking architecture 500 is included in a computing system such as the controller 110 shown in FIGS. 1 and 2; the electronic device 120 shown in FIGS. 1 and 3; and/or a suitable combination thereof.

As shown in FIG. 5A, one or more local sensors 502 of the controller 110, the electronic device 120, and/or a combination thereof obtain local sensor data 503 associated with the physical environment 105 in FIG. 1. For example, the local sensor data 503 includes images or a stream thereof of the physical environment 105, simultaneous location and mapping (SLAM) information for the physical environment 105 and the location of the electronic device 120 or the user relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the local sensor data 503 includes un-processed or post-processed information.

Similarly, as shown in FIG. 5A, one or more remote sensors 504, associated with the optional remote input devices within the physical environment 105, the control device 130, and/or the like, obtain remote sensor data 505 associated with the physical environment 105 in FIG. 1. For example, the remote sensor data 505 includes images or a stream thereof of the physical environment 105, SLAM information for the physical environment 105 and the location of the electronic device 120 or the user relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the remote sensor data 505 includes un-processed or post-processed information.

According to some implementations, the privacy architecture 508 ingests the local sensor data 503 and the remote sensor data 505. In some implementations, the privacy architecture 508 includes one or more privacy filters associated with user information and/or identifying information. In some implementations, the privacy architecture 508 includes an opt-in feature where the electronic device 120 informs the user as to what user information and/or identifying information is being monitored and how the user information and/or the identifying information will be used. In some implementations, the privacy architecture 508 selectively prevents and/or limits the input tracking architecture 500 or portions thereof from obtaining and/or transmitting the user information. To this end, the privacy architecture 508 receives user preferences and/or selections from the user in response to prompting the user for the same. In some implementations, the privacy architecture 508 prevents the input tracking architecture 500 from obtaining and/or transmitting the user information unless and until the privacy architecture 508 obtains informed consent from the user. In some implementations, the privacy architecture 508 anonymizes (e.g., scrambles, obscures, encrypts, and/or the like) certain types of user information. For example, the privacy architecture 508 receives user inputs designating which types of user information the privacy architecture 508 anonymizes. As another example, the privacy architecture 508 anonymizes certain types of user information likely to include sensitive and/or identifying information, independent of user designation (e.g., automatically).

According to some implementations, the hand/extremity/joint tracking engine 510 obtains the local sensor data 503 and the remote sensor data 505 after it has been subjected to the privacy architecture 508. In some implementations, the hand/extremity/joint tracking engine 510 determines/generates a hand tracking vector 511 based on the input data and updates the hand tracking vector 511 over time.

Figure 5B:
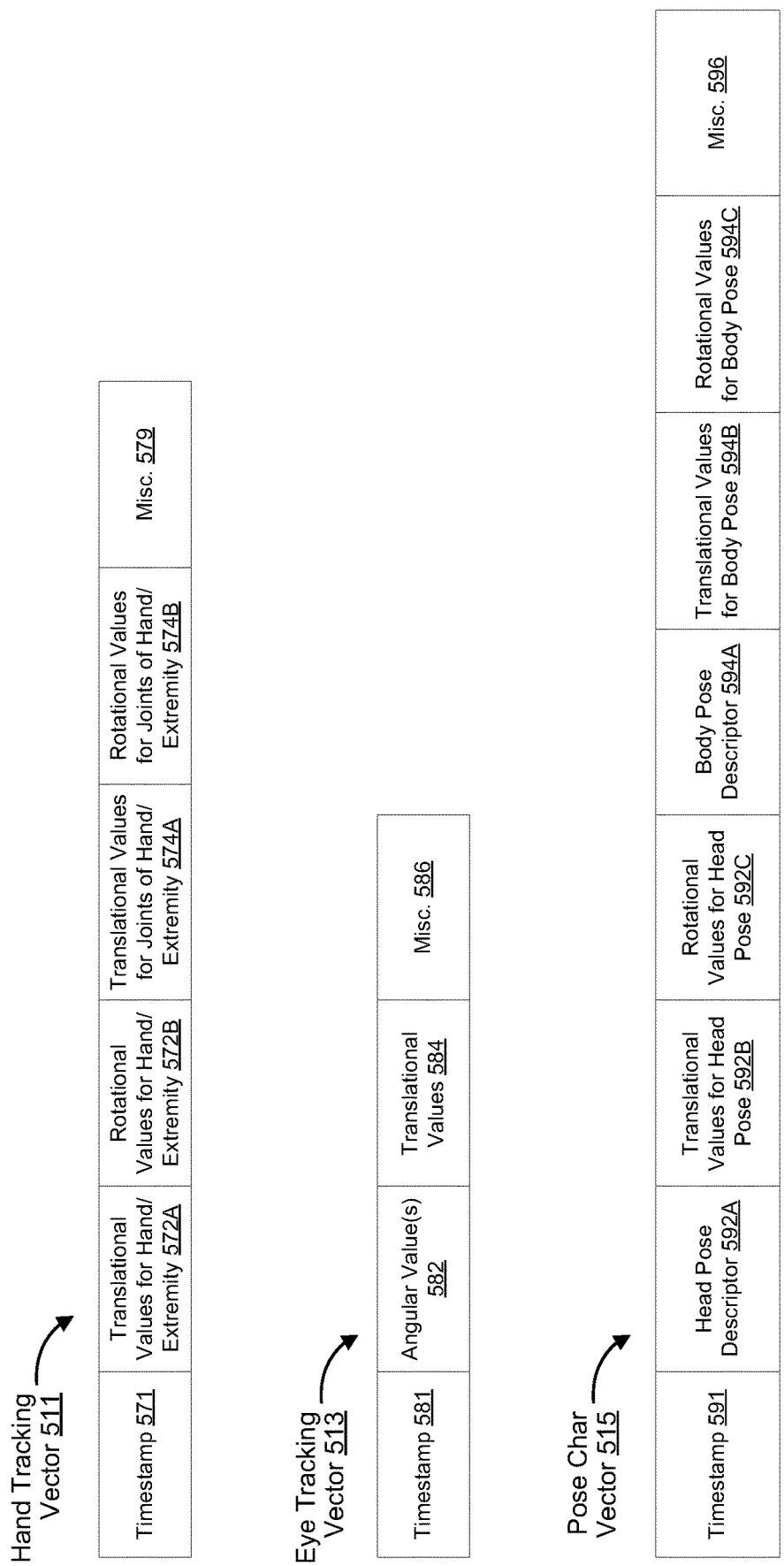
FIG. 5B illustrates example data structures related to the input tracking architecture in FIG. 5A in accordance with some implementations.

FIG. 5B shows an example data structure for the hand tracking vector 511 in accordance with some implementations. As shown in FIG. 5B, the hand tracking vector 511 may correspond to an N-tuple characterization vector or characterization tensor that includes a timestamp 571 (e.g., the most recent time hand tracking vector 511 was updated), translational values for a hand/extremity 572A, rotational values for a hand/extremity 572B, (optional) translational values for individual joints of the hand/extremity 574A, (optional) rotational values for individual joints of the hand/extremity 574B, and/or miscellaneous information 579. One of ordinary skill in the art will appreciate that the data structure for the hand tracking vector 511 in FIG. 5B is merely an example that may include different information portions in various other implementations and be structured in myriad ways in various other implementations.

According to some implementations, the eye tracking engine 512 obtains the local sensor data 503 and the remote sensor data 505 after it has been subjected to the privacy architecture 508. In some implementations, the eye tracking engine 512 determines/generates an eye tracking vector 513 associated with a gaze direction of the user based on the input data and updates the eye tracking vector 513 over time.

FIG. 5B shows an example data structure for the eye tracking vector 513 in accordance with some implementations. As shown in FIG. 5B, the eye tracking vector 513 may correspond to an N-tuple characterization vector or characterization tensor that includes a timestamp 581 (e.g., the most recent time the eye tracking vector 513 was updated), one or more angular values 582 for a current gaze direction of the user (e.g., roll, pitch, and yaw values), one or more translational values 584 for the current gaze direction of the user (e.g., x, y, and z values relative to the physical environment 105, the world-at-large, and/or the like), and/or miscellaneous information 586. One of ordinary skill in the art will appreciate that the data structure for the eye tracking vector 513 in FIG. 5B is merely an example that may include different information portions in various other implementations and be structured in myriad ways in various other implementations.

For example, the gaze direction indicates a point (e.g., associated with x, y, and z coordinates relative to the physical environment 105 or the world-at-large), a physical object, or a region of interest (ROI) in the physical environment 105 at which the user is currently looking. As another example, the gaze direction indicates a point (e.g., associated with x, y, and z coordinates relative to the XR environment), an XR object, or a region of interest (ROI) in the XR environment at which the user is currently looking.

According to some implementations, the head/body pose tracking engine 514 obtains the local sensor data 503 and the remote sensor data 505 after it has been subjected to the privacy architecture 508. In some implementations, the head/body pose tracking engine 514 determines/generates a pose characterization vector 515 based on the input data and updates the pose characterization vector 515 over time.

FIG. 5B shows an example data structure for the pose characterization vector 515 in accordance with some implementations. As shown in FIG. 5B, the pose characterization vector 515 may correspond to an N-tuple characterization vector or characterization tensor that includes a timestamp 591 (e.g., the most recent time the pose characterization vector 515 was updated), a head pose descriptor 592A (e.g., upward, downward, neutral, etc.), translational values for the head pose 592B, rotational values for the head pose 592C, a body pose descriptor 594A (e.g., standing, sitting, prone, etc.), translational values for the body pose 594B, rotational values for the body pose 594C, and/or miscellaneous information 596. In some implementations, the pose characterization vector 515 also includes information associated with finger/hand/extremity tracking. One of ordinary skill in the art will appreciate that the data structure for the pose characterization vector 515 in FIG. 5B is merely an example that may include different information portions in various other implementations and be structured in myriad ways in various other implementations.

Figure 6A:
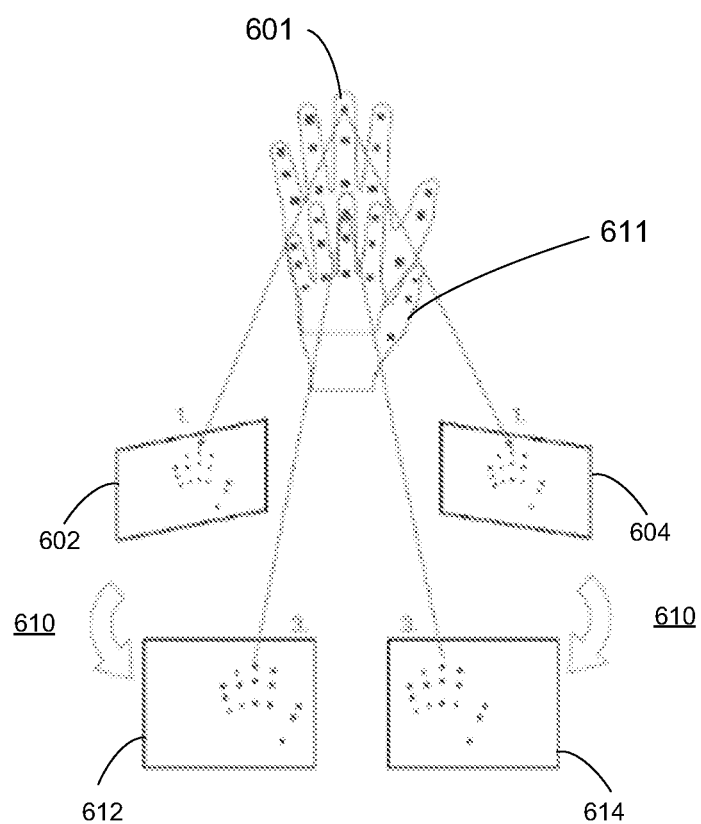
FIGS. 6A and 6B illustrate processes for improved hand tracking in accordance with some implementations.

FIGS. 6A-6D illustrate processes for improved hand tracking according to some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, FIG. 6A illustrates an image 602 of the physical environment 301 in FIGS. 3 and 4. As shown in FIG. 6A, the image 602 includes a hand 601 of a user relative to an image space/plane. For example, the image 602 is captured by the left image sensor 421a of the HMD 430 in FIG. 4.

According to some implementations, the HMD 420 or a component thereof (e.g., the perspective transforming unit 1044 in FIG. 10) performs a POV correction process on the image 602 by transforming (610) the image 602 to make it appear as though it was captured from the perspective of the left eye 411a rather than the perspective of the left image sensor 421a. e.g., to appear as a transformed image 612 in a display space. For example, the transformed image 612 may be reprojected into the image space/plane to illustrate the POV corrected hand 611.

In various implementations, the HMD 420 transforms the image 602 based on the image 602, depth values associated with the image 602, and a difference between the perspective of the left image sensor 421a and the perspective of the left eye 411a. In various implementations, the difference between the perspective of the left image sensor 421a and the perspective of the left eye 411a is determined during a calibration procedure. In various implementations, the depth value for a pixel of the image 602 represents the distance from the left image sensor 421a to an object or a surface within the physical environment 301 represented by the pixel. In various implementations, the depth values are used to generate a depth map including a respective depth value for each pixel of the image 602. In various implementations, for each pixel location of the transformed image 612, a corresponding pixel location of the image 602 is determined based on depth value associated with the pixel location.

In various implementations, the resulting transformed image 612 includes holes, e.g., pixel locations of the transformed image 612 for which there is no corresponding pixel location of the image 602. Such holes may be filled via interpolation or using additional images, such as another image from a different perspective (e.g., from the right image sensor 421b or from the left image sensor 421a at a different time). In various implementations, the resulting transformed image 612 includes ambiguities, e.g., pixel locations of the transformed image 612 for where there are multiple corresponding pixel locations of the image 602. Such ambiguities may be disambiguated using averaging or consensus algorithms.

FIG. 6A also illustrates an image 604 of the physical environment 301 in FIGS. 3 and 4. As shown in FIG. 6A, the image 604 includes the hand 601 of the user relative to the image/plane. For example, the image 604 is captured by the right image sensor 421b of the HMD 430 in FIG. 4.

According to some implementations, the HMD 420 or a component thereof (e.g., the perspective transforming unit 1044 in FIG. 10) performs a POV correction process on the image 604 by transforming (610) the image 604 to make it appear as though it was captured from the perspective of the right eye 411b rather than the perspective of the right image sensor 421b, e.g., to appear as the transformed image 614 in the display space. For example, the transformed image 614 may be reprojected into the image/plane to illustrate the POV corrected hand 611.

In various implementations, the HMD 420 transforms the image 604 based on the image 604, depth values associated with the image 604, and a difference between the perspective of the right image sensor 421b and the perspective of the right eye 411b. In various implementations, the difference between the perspective of the right image sensor 421b and the perspective of the right eye 411b is determined during a calibration procedure. In various implementations, the depth value for a pixel of the image 604 represents the distance from the right image sensor 421b to an object or a surface within the physical environment 301 represented by the pixel. In various implementations, the depth values are used to generate a depth map including a respective depth value for each pixel of the image 604. In various implementations, for each pixel location of the transformed image 614, a corresponding pixel location of the image 604 is determined based on depth value associated with the pixel location.

In various implementations, the resulting transformed image 614 includes holes, e.g., pixel locations of the transformed image 614 for which there is no corresponding pixel location of the image 604. Such holes may be filled via interpolation or using additional images, such as another image from a different perspective (e.g., from the right image sensor 421b or from the left image sensor 421a at a different time). In various implementations, the resulting transformed image 614 includes ambiguities, e.g., pixel locations of the transformed image 614 for where there are multiple corresponding pixel locations of the image 604. Such ambiguities may be disambiguated using averaging or consensus algorithms.

Figure 6B:
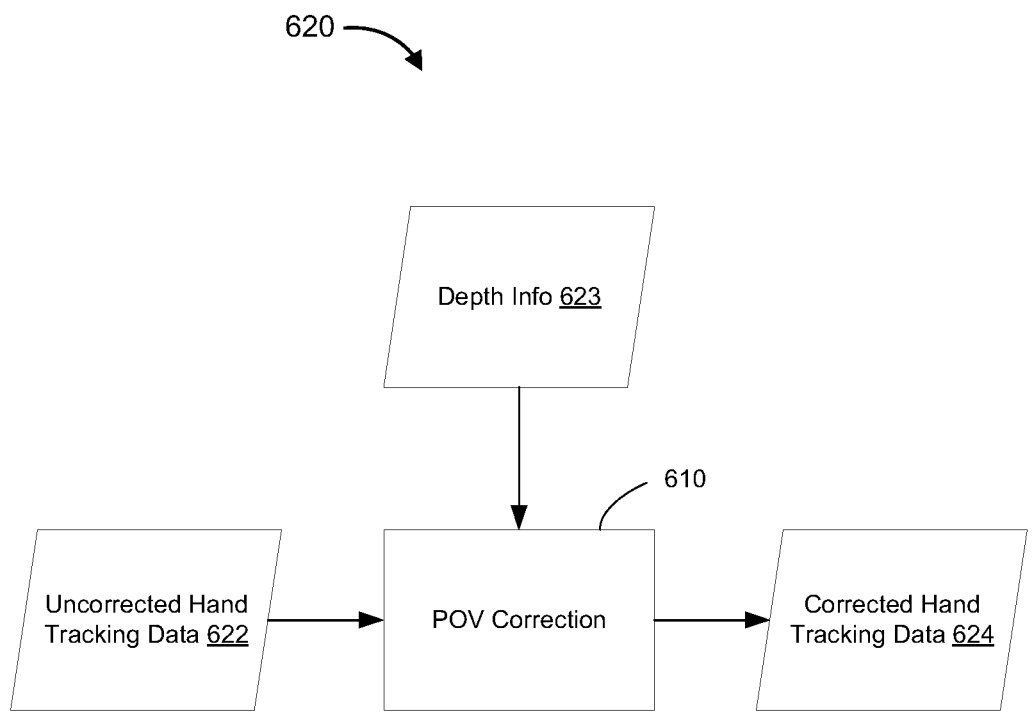

FIG. 6B illustrates a method 620 for performing a POV correction process by transforming hand tracking data according to some implementations. In various implementations, the method 620 is performed by a device with one or more processors, non-transitory memory, an image sensor, and a display (e.g., the electronic device 120 of FIG. 1). In some implementations, the method 620 is performed by processing logic, including hardware, firmware, software, or a combination thereof. In some implementations, the method 620 is performed by a processor executing instructions (e.g., code) stored in a non-transitory computer-readable medium (e.g., a memory)

As shown in FIG. 6B, the method 620 includes obtaining (e.g., receiving, retrieving, capturing, etc.) uncorrected hand tracking data 622 (e.g., the images 602 and 604 of the hand 601 in FIG. 6A, or the hand tracking vector 511 in FIGS. 5A and 5B). As shown in FIG. 6B, the method 620 also includes obtaining (e.g., receiving, retrieving, capturing, etc.) depth information 623 associated with the physical environment 301 via one or more depth sensors (e.g., the one or more depth sensors 1016 of the electronic device 120 in FIG. 10). In various implementations, the depth information includes a depth map for the physical environment. In various implementations, the depth map is based on an initial depth map in which the value of each pixel represents the depth to the object represented by the pixel. For example, the depth map may be an altered version of the initial depth map.

Thus, in various implementations, obtaining the depth information of the physical environment includes determining the depth value for the camera set of two-dimensional coordinates (e.g., the image space/plane) via interpolation using depth values of locations surrounding the camera set of two-dimensional coordinates. In various implementations, the depth value is determined using a three-dimensional model of the physical environment. For example, the depth value can be determined using ray tracing from the camera location through the image plane at the pixel location to a static object in the three-dimensional model. Thus, in various implementations, obtaining the depth information of the physical environment includes determining a depth value for the camera set of two-dimensional coordinates based on a three-dimensional model of the physical environment.

In various implementations, the depth information of the physical environment is a smoothed depth map resulting from spatially filtering an initial depth map. In various implementations, the depth information of the physical environment is a clamped depth map in which each pixel of an initial depth map having a value below a depth threshold is replaced with the depth threshold.

The method 620 further includes performing a POV correction process on the uncorrected hand tracking data 622 by transforming (610) the uncorrected hand tracking data 622 into corrected hand tracking data 624 (e.g., the transformed images 612 and 614 in FIG. 6A) based on the depth information 623. According to some implementations, the POV correction process includes transforming the camera set of two-dimensional coordinates (e.g., the image space/plane associated with the images 602 and 604 in FIG. 6A) into a display set of two-dimensional coordinates (e.g., the display space/plane associated with the transformed images 612 and 614 in FIG. 6A) based on the depth information. In various implementations, the transformation is based on a difference between the perspective of the image sensor that captured the image of the physical environment and the perspective of the user.

In various implementations, the display set of two-dimensional coordinates is determined according to the following relation in which $x_c$ and $y_c$ are the camera set of two-dimensional coordinates, $x_d$ and $y_d$ are the display set of two-dimensional coordinates, $P_c$ is a 4×4 view projection matrix of the image sensor representing the perspective of the image sensor, $P_d$ is a 4×4 view projection matrix of the user representing the perspective of the user, and d is the depth map value at the camera set of two-dimensional coordinates:

$$\begin{bmatrix} x_d \\ y_d \end{bmatrix} \leftarrow P_d \cdot P_c^{-1} \cdot \begin{bmatrix} x_c \\ y_c \\ d \\ 1 \end{bmatrix}.$$

In various implementations, the method 620 further comprises determining an input set of three-dimensional coordinates in the physical environment by triangulating the display set of two-dimensional coordinates and a second display set of two-dimensional coordinates. In various implementations, the second display set of two-dimensional coordinates are obtained in a similar manner to the display set of two-dimensional coordinates for a second camera plane or second image sensor, e.g., for a second eye of the user wherein the display set of two-dimensional coordinates are determined for a first eye of the user. For example, in various implementations, the device projects the physical set of three-dimensional coordinates to a second image plane to obtain a second camera set of two-dimensional coordinates and transforms them, using depth information, to generate the second display set of two-dimensional coordinates.

Figure 6C:
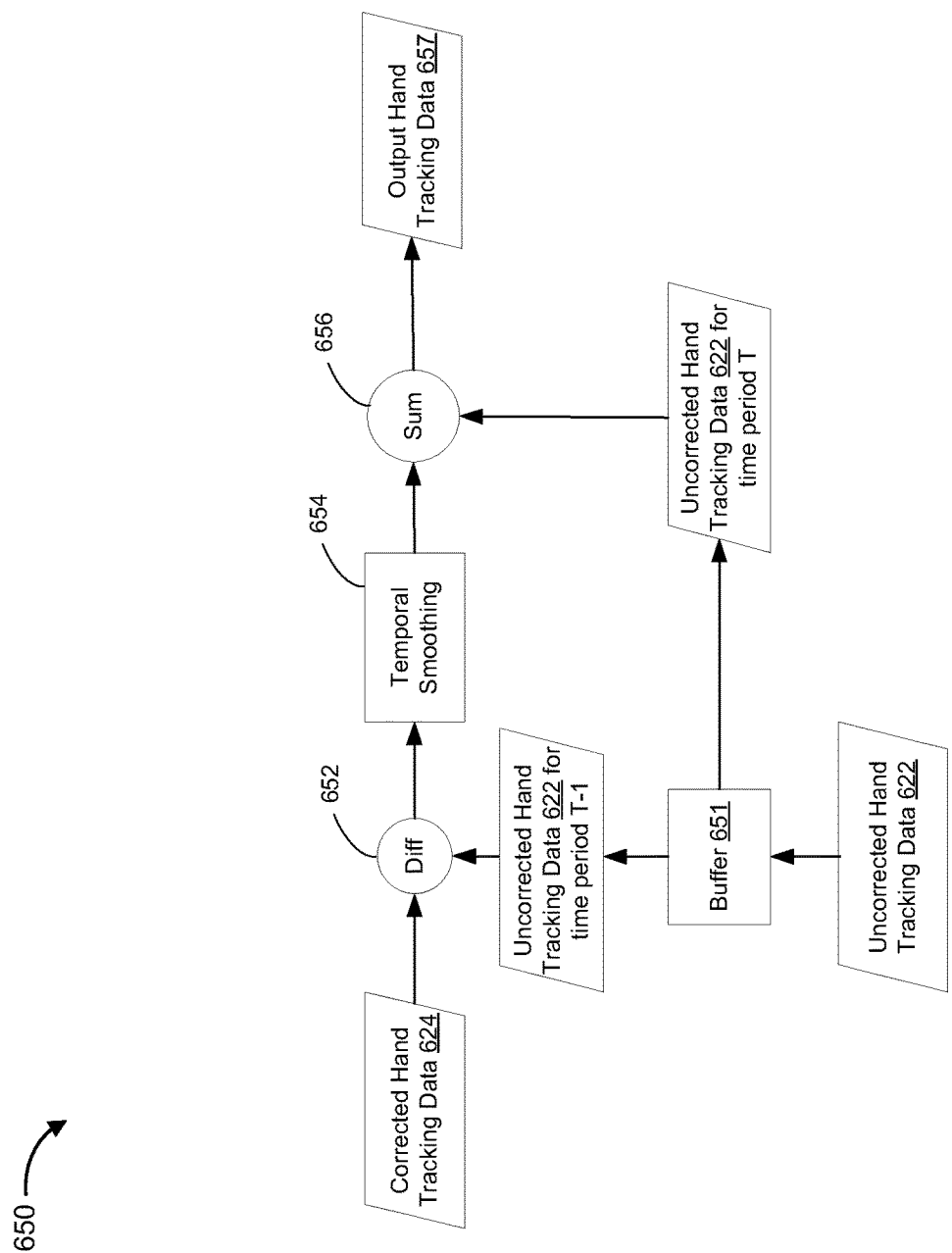
FIG. 6C is a block diagram of a temporally-differential depth smoothing architecture for improved hand tracking in accordance with some implementations.

FIG. 6C is a block diagram of a temporally-differential depth smoothing architecture 650 for improved hand tracking in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the temporally-differential depth smoothing architecture 650 obtains (e.g., receives, retrieves, captures, etc.) the uncorrected hand tracking data 622 (e.g., the hand tracking vector 511 described above with reference to FIGS. 5A and 5B) and stores the uncorrected hand tracking data 622 obtained over time in a buffer 651.

In FIG. 6C, the temporally-differential depth smoothing architecture 650 obtains (e.g., receives, retrieves, captures, etc.) corrected hand tracking data 624 (e.g., the output of the method 620 in FIG. 6B). With further reference to FIG. 6C, the temporally-differential depth smoothing architecture 650 performs (652) a difference operation between the corrected hand tracking data 624 and the uncorrected hand tracking data 622 for a current time period T to generate differential hand tracking data.

As shown in FIG. 6C, the temporally-differential depth smoothing architecture 650 performs (654) temporal smoothing on the differential hand tracking data (e.g., the output of the difference operator 652 in FIG. 6C) to generate temporally smoothed hand tracking data. One of ordinary skill in the art will appreciate that temporal smoothing corresponds to interpolating, extrapolating, etc. data over time to reduce noise, discontinuities, and/or the like.

In FIG. 6C, the temporally-differential depth smoothing architecture 650 performs (656) a summation operation between the temporally smoothed hand tracking data (e.g., the output of block 654 in FIG. 6C) and the uncorrected hand tracking data 622 for the current time period T to generate output hand tracking data 657.

Figure 6D:
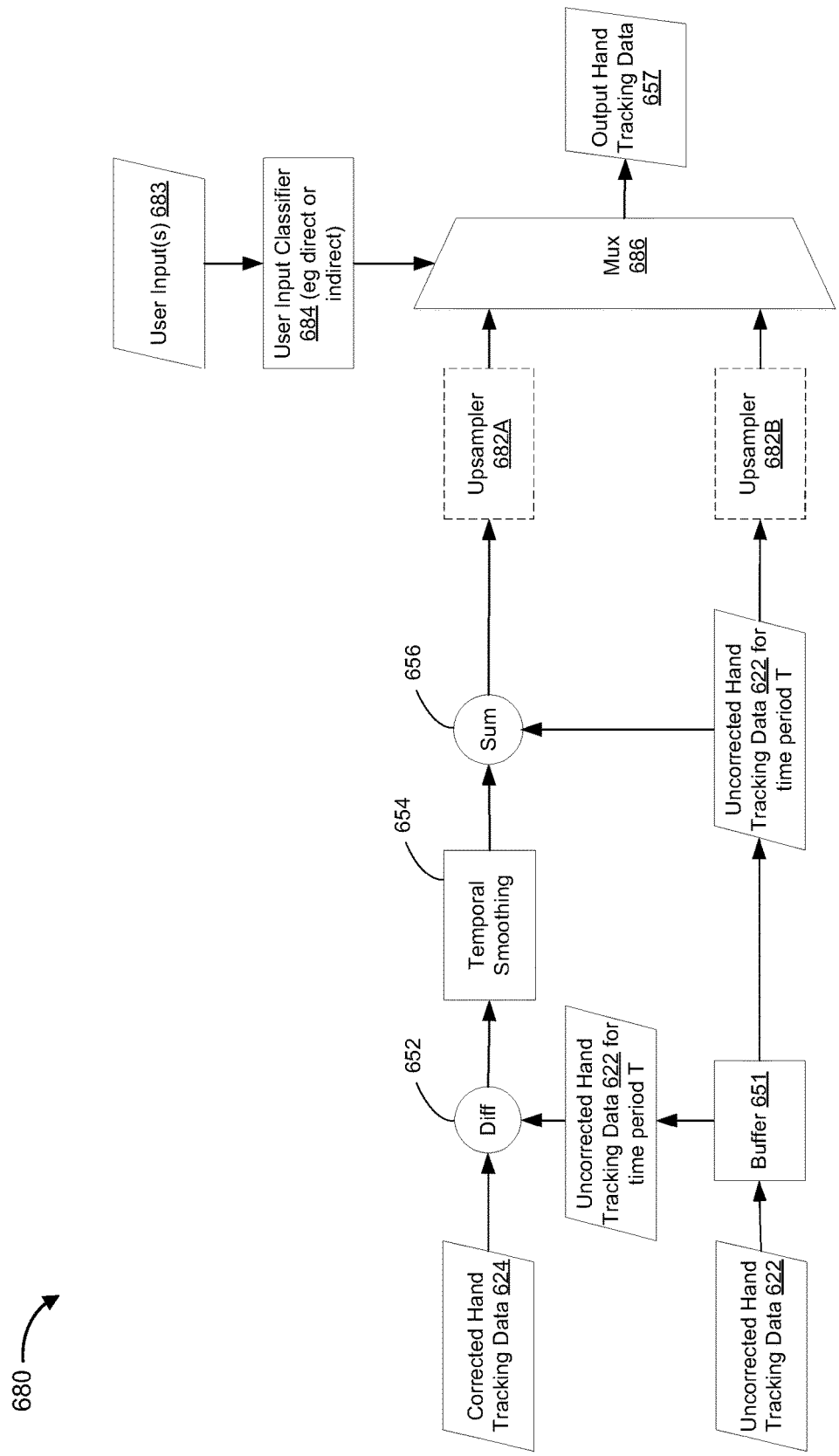
FIG. 6D is a block diagram of a heuristic-based temporally-differential depth smoothing architecture for improved hand tracking in accordance with some implementations.

FIG. 6D is a block diagram of a heuristic-based temporally-differential depth smoothing architecture 680 for improved hand tracking in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, the heuristic-based temporally-differential smoothing architecture 680 in FIG. 6D is similar to and adapted from the temporally-differential depth smoothing architecture 650 in FIG. 6C. As such, similar reference numbers are used in FIGS. 6C and 6D and only the differences will be discussed for the sake of brevity.

As shown in FIG. 6D, the heuristic-based temporally-differential depth smoothing architecture 680) includes an optional upsampler 682A (e.g., 90 Hz) configured to upsample the output of the summation operator 656 and an optional upsampler 682B (e.g., 90) Hz) configured to upsample the uncorrected hand tracking data 622 for the time period T.

In FIG. 6D, the upsamplers 682A and 682B are inputs to a multiplexer 686. According to some implementations, the multiplexer 686 includes heuristic logic for selecting between the input from the upsampler 682A or the input from the upsampler 682B based on an input classification type (e.g., direct versus indirect inputs). With further reference to FIG. 6D, the heuristic-based temporally-differential depth smoothing architecture 680 obtains (e.g., receives, retrieves, captures, etc.) one or more user inputs 683 (e.g., user input information), and a user input classifier 684 determines whether the one or more user inputs 683 correspond to a direct input (e.g., a direct user interaction with XR content such as making direct contact to tap a button on a user interface, picking up a virtual stuffed animal, translating a virtual racecar, rotating a virtual globe, or the like with his/her hands) or an indirect input (e.g., pinching and dragging XR content when hands are positioned away from the XR content, selecting an affordance from a menu with a voice input, voice inputs, hand gesture linked to an action, etc.).

According to a determination that the one or more user inputs 683 correspond to a direct input type, the multiplexer 686 selects the input from the upsampler 682A as the output hand tracking data 657. According to a determination that the one or more user inputs 683 correspond to an indirect input type, the multiplexer 686 selects the input from the upsampler 682B as the output hand tracking data 657. In other words, according to some implementations, absolute joint locations are used for direct inputs because the user is directly interacting with a virtual object with their hands. However, relative motion of joints (e.g., differential changes in joint position/rotation) is used for indirect inputs because the user is indirectly interacting with a user interface or the virtual object with their hands. As a result, the POV correction block 610 and the temporal smoothing block 660 may be bypassed for indirect input types to reduce resource consumption, latency, thermal load, and/or the like.

Figure 7:
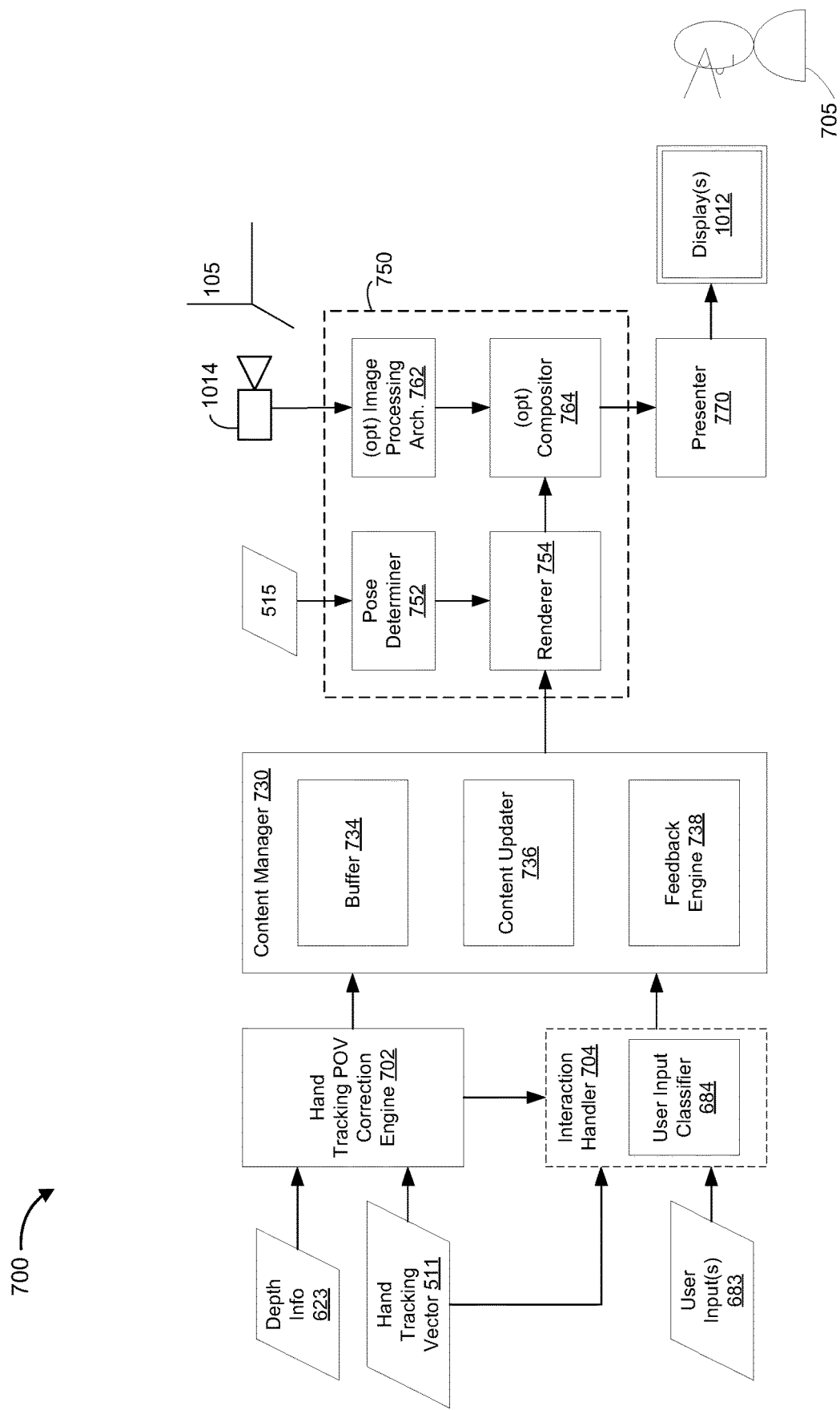
FIG. 7 is a block diagram of an example content delivery architecture in accordance with some implementations.

FIG. 7 is a block diagram of an example content delivery architecture 700 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content delivery architecture 700 is included in a computing system such as the controller 110 shown in FIGS. 1 and 9; the electronic device 120 shown in FIGS. 1 and 10; and/or a suitable combination thereof.

According to some implementations, a hand tracking POV correction engine 702 obtains (e.g., receives, retrieves, generates, determines, etc.) the hand tracking vector 511 (e.g., the uncorrected hand tracking data 622 in FIGS. 6A-6D) and the depth information 623. According to some implementations, the hand tracking POV correction engine 702 performs the method 620 described in FIG. 6B to generate corrected hand tracking data based on the hand tracking vector 511 (e.g., the uncorrected hand tracking data 622 in FIGS. 6A-6D) and the depth information 623.

In some implementations, the hand tracking POV correction engine 702, the interaction handler 704, and/or a combination thereof corresponds to the temporally-differential depth smoothing architecture 650 in FIG. 6C, which generates output hand tracking data 663 (e.g., corrected hand tracking data) based on the hand tracking vector 511 (e.g., the uncorrected hand tracking data 622 in FIGS. 6A-6D) and the depth information 623. The temporally-differential depth smoothing architecture 650 is described above in more detail with reference to FIG. 6C.

In some implementations, the interaction handler 704 obtains (e.g., receives, retrieves, or detects) one or more user inputs 683 such as eye tracking or gaze-based inputs, hand, touch inputs, voice inputs, and/or the like. In various implementations, the interaction handler 704 determines appropriate modifications to the user interface or the XR environment (e.g., translating an XR object, rotating an XR object, modifying the appearance of an XR object, adding or removing an XR object, and/or the like) based on the uncorrected hand tracking data, corrected hand tracking data, and/or the one or more user inputs 683.

In some implementations, the interaction handler 704 or a component thereof (e.g., the user input classifier 684) determines whether the one or more user inputs 683 correspond to a direct input (e.g., a direct user interaction with XR content such as making direct contact to tap a button on a user interface, picking up a virtual stuffed animal, translating a virtual racecar, rotating a virtual globe, or the like with his/her hands) or an indirect input (e.g., pinching and dragging XR content when hands are positioned away from the XR content, selecting an affordance from a menu, voice inputs, hand gesture linked to an action, etc.). In some implementations, the hand tracking POV correction engine 702, the interaction handler 704, and/or a combination thereof corresponds to the heuristic-based temporally-differential depth smoothing architecture 680 in FIG. 6D, which generates output hand tracking data 663 (e.g., corrected hand tracking data or uncorrected hand tracking data) based on the hand tracking vector 511 (e.g., the uncorrected hand tracking data 622 in FIGS. 6A-6D), the depth information 623, and the input classification type. The heuristic-based temporally-differential depth smoothing architecture 680 is described above in more detail with reference to FIG. 6D.

In various implementations, the content manager 730 manages and updates the layout, setup, structure, and/or the like for the UI or the XR environment, including one or more of VAs, XR content, one or more UI elements associated with the XR content, and/or the like, based on the uncorrected hand tracking data, the corrected hand tracking data, and/or the one or more user inputs 683. To that end, the content manager 730 includes the buffer 734, the content updater 736, and the feedback engine 738.

In some implementations, the buffer 734 includes XR content, a rendered image frame, and/or the like for one or more past instances and/or frames. In some implementations, the content updater 736 modifies the user interface or the XR environment over time based on the corrected hand tracking data, the one or more user inputs 683, and/or the like. In some implementations, the feedback engine 738 generates sensory feedback (e.g., visual feedback such as text or lighting changes, audio feedback, haptic feedback, etc.) associated with the user interface or the XR environment based on the corrected hand tracking data, the one or more user inputs 683, and/or the like.

According to some implementations, with reference to the rendering engine 750 in FIG. 7, the pose determiner 752 determines a current camera pose of the electronic device 120 and/or a user 705 relative to the XR environment and/or the physical environment based at least in part on the pose characterization vector 515. In some implementations, the renderer 754 renders the XR content and/or the like according to the current camera pose relative thereto.

According to some implementations, the optional image processing architecture 762 obtains an image stream from one or more image sensors 1014 including one or more images of the physical environment from the current camera pose of the electronic device 120 and/or the user 705. In some implementations, the image processing architecture 762 also performs one or more image processing operations on the image stream such as warping, color correction, gamma correction, sharpening, noise reduction, white balance, and/or the like. In some implementations, the optional compositor 764 composites the rendered XR content with the processed image stream of the physical environment from the image processing architecture 762 to produce rendered image frames of the XR environment. In various implementations, the presenter 770) presents the rendered image frames of the XR environment to the user 705 via the one or more displays 1012. One of ordinary skill in the art will appreciate that the optional image processing architecture 762 and the optional compositor 764 may not be applicable for fully virtual environments (or optical see-through scenarios).

Figure 8A:
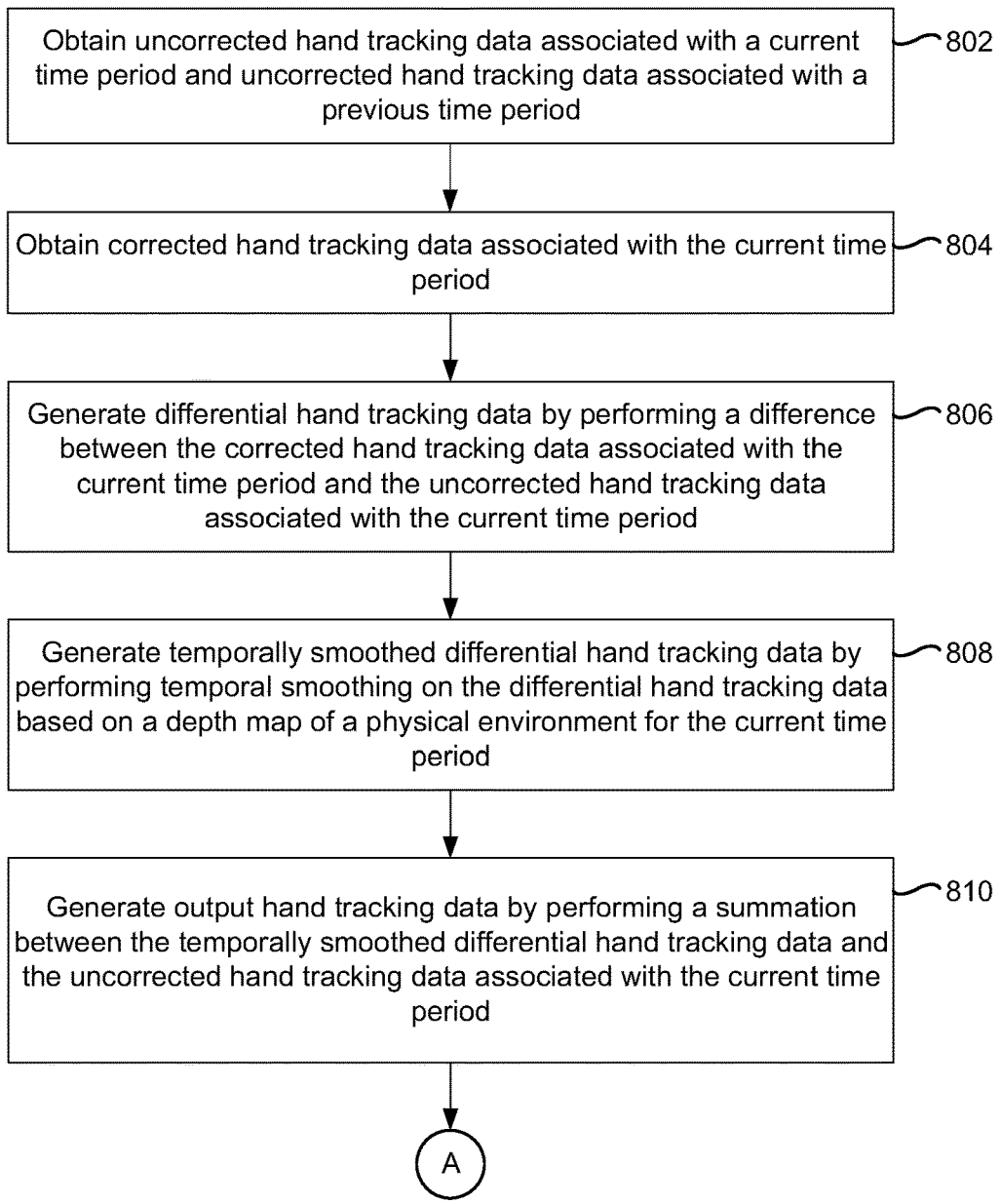
FIGS. 8A and 8B illustrate a flowchart representation of a method of improved hand tracking in accordance with some implementations.
Figure 8B:
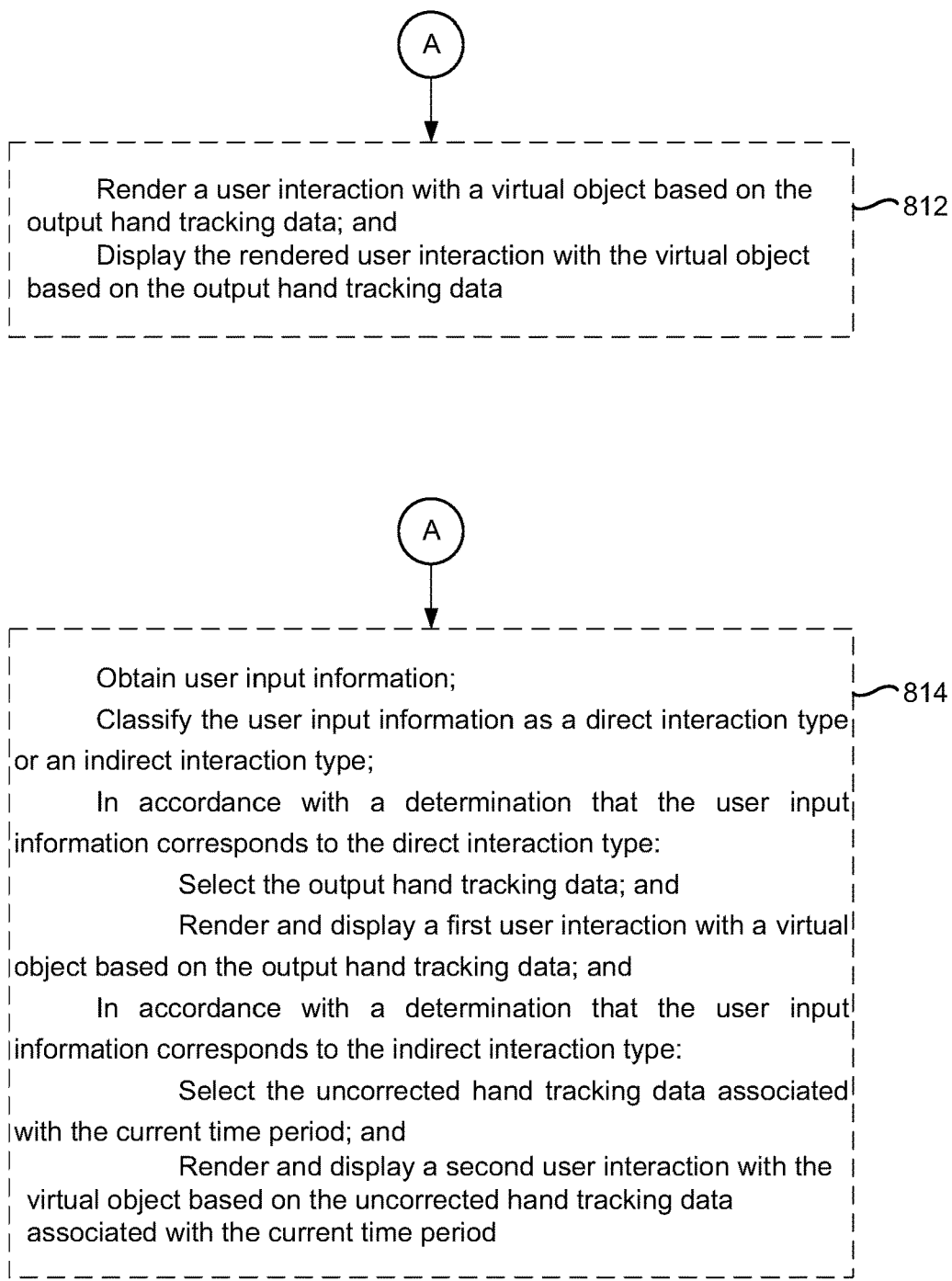

FIGS. 8A and 8B illustrate a flowchart representation of a method 800 of improved hand tracking in accordance with some implementations. In various implementations, the method 800 is performed at a computing system including non-transitory memory and one or more processors, wherein the computing system is communicatively coupled to a display device and one or more input devices via a communication interface (e.g., the controller 110 in FIGS. 1 and 9, the electronic device 120 in FIGS. 1 and 10, or a combination thereof). In some implementations, the method 800 is performed by processing logic, including hardware, firmware, software, or a combination thereof. In some implementations, the method 800 is performed by a processor executing code stored in a non-transitory computer-readable medium (e.g., a memory). In some implementations, the computing system corresponds to one of a tablet, a laptop, a mobile phone, a near-eye system, a wearable computing device, or the like.

As represented by block 802, the method 800 includes obtaining uncorrected hand tracking data associated with a current time period and uncorrected hand tracking data associated with a previous time period. As one example, with reference to FIG. 6C, the temporally-differential depth smoothing architecture 650 obtains (e.g., receives, retrieves, captures, etc.) the uncorrected hand tracking data 622 (e.g., the hand tracking vector 511 described above with reference to FIGS. 5A and 5B) and stores the uncorrected hand tracking data 622 obtained over time in a buffer 651.

As represented by block 804, the method 800 includes obtaining corrected hand tracking data associated with the current time period. As one example, with reference to FIG. 6C, the temporally-differential depth smoothing architecture 650 obtains (e.g., receives, retrieves, captures, etc.) corrected hand tracking data 624 (e.g., the output of the method 620 in FIG. 6B).

In some implementations, obtaining the corrected hand tracking data includes: obtaining a first set of two-dimensional coordinates of a hand of the user in a physical environment; and transforming the first set of two-dimensional coordinates into a second set of two-dimensional coordinates based on a depth map of the physical environment. In some implementations, the method 800 includes displaying, via the display device, hand locations at the second set of two-dimensional coordinates.

In some implementations, the first set of two-dimensional coordinates are generated by projecting first three-dimensional coordinates onto an image plane. According to some implementations, the first set of two-dimensional coordinates includes a left set and a right set used for triangulation. For example, FIG. 6A illustrates the image 602 captured by the left image sensor 421*a* and the image 604 captured by the right image sensor 421*b* of the HMD 430 in FIG. 4.

In some implementations, a second set of three-dimensional coordinates is generated from the second set of two-dimensional coordinates. According to some implementations, the method 800 includes determining a user interaction based on the hand location at the second set of three-dimensional coordinates interacting with a virtual object at the three-dimensional coordinates.

As represented by block 806, the method 800 includes generating differential hand tracking data by performing a difference between the corrected hand tracking data associated with the current time period and the uncorrected hand tracking data associated with the current time period. As one example, with reference to FIG. 6C, the temporally-differential depth smoothing architecture 650 performs (652) a difference operation between the corrected hand tracking data 624 and the uncorrected hand tracking data 622 for a current time period T to generate differential hand tracking data.

As represented by block 808, the method 800 includes generating temporally smoothed differential hand tracking data by performing temporal smoothing on the differential hand tracking data based on a depth map of a physical environment for the current time period. As one example, with reference to FIG. 6C, the temporally-differential depth smoothing architecture 650 performs (654) temporal smoothing on the differential hand tracking data (e.g., the output of the difference operator 652 in FIG. 6C) to generate temporally smoothed hand tracking data.

As represented by block 810, the method 800 includes generating output hand tracking data by performing a summation between the temporally smoothed differential hand tracking data and the uncorrected hand tracking data associated with the current time period. As one example, with reference to FIG. 6C, the temporally-differential depth smoothing architecture 650) performs (656) a summation operation between the temporally smoothed hand tracking data (e.g., the output of block 654 in FIG. 6C) and the uncorrected hand tracking data 622 for the current time period T to generate output hand tracking data 657.

According to some implementations, as represented by block 812, the method 800 includes: rendering a user interaction with a virtual object based on the output hand tracking data; and displaying, via the display device, the rendered user interaction with the virtual object based on the output hand tracking data.

According to some implementations, as represented by block 814, the method 800 includes: obtaining user input information; and classifying the user input information as a direct interaction type or an indirect interaction type. In accordance with a determination that user input information corresponds to the direct interaction type, the method 800 includes: selecting the output hand tracking data; and rendering and displaying, via the display device, a first user interaction with a virtual object based on the output hand tracking data. In accordance with a determination that user input information corresponds to the indirect interaction type, the method 800 includes: selecting the uncorrected hand tracking data associated with the current time period; and rendering and displaying, via the display device, a second user interaction with the virtual object based on the uncorrected hand tracking data associated with the current time period.

According to some implementations, during a transition from using the output hand tracking data to the uncorrected hand tracking data (or vice versa), the computing system may present an animation adjacent to the user's hand(s) to indicate the transition. According to some implementations, during a transition from using the output hand tracking data to the uncorrected hand tracking data (or vice versa), the computing system may present a fade-out and/or fade-in animation adjacent to the user's hand(s) to indicate the transition. According to some implementations, during a transition from using the output hand tracking data to the uncorrected hand tracking data (or vice versa), the computing system may temporarily blur the user's hand(s) to indicate the transition. According to some implementations, during a transition from using the output hand tracking data to the uncorrected hand tracking data (or vice versa), the computing system may present a hysteresis effect adjacent to the user's hand(s) to indicate the transition.

In some implementations, the direct interaction type corresponds to a hand tracking input relative to the virtual object. As one example of the direct interaction, the computing system may detect a user reaching out within the physical environment to seemingly touch or interact with the virtual object.

In some implementations, the indirect interaction type corresponds to one of an eye tracking input, a voice input, a gestural input relative to the virtual object, a combination thereof, and/or the like. As one example of the indirect interaction, the computing system may detect a user gazing at a virtual object and performing a pinch gesture to translate, rotate, or otherwise modify the virtual object. As another example of the indirect interaction, the computing system may detect a user voice command to translate, rotate, or otherwise modify the virtual object.

As one example, with reference to FIG. 6D, the heuristic-based temporally-differential depth smoothing architecture 680 obtains (e.g., receives, retrieves, captures, etc.) one or more user inputs 683, and a user input classifier 684 determines whether the one or more user inputs 683 correspond to a direct input (e.g., a user interaction with XR content such as picking up a virtual stuffed animal, translating a virtual racecar, rotating a virtual globe, or the like with his/her hands) or an indirect input (e.g., selecting an affordance from a menu, voice inputs, hand gesture linked to an action, etc.).

Continuing with this example, according to a determination that the one or more user inputs 683 correspond to a direct input type, the heuristic-based temporally-differential depth smoothing architecture 680 or a component thereof (e.g., the multiplexer 686) selects the input from the upsampler 682A as the output hand tracking data 657. Further continuing with this example, according to a determination that the one or more user inputs 683 correspond to an indirect input type, the heuristic-based temporally-differential depth smoothing architecture 680 or a component thereof (e.g., the multiplexer 686) selects the input from the upsampler 682B as the output hand tracking data 657. As a result, the temporal smoothing block 654 may be bypassed for indirect input types to reduce resource consumption, latency, thermal load, and/or the like.

Figure 8C:
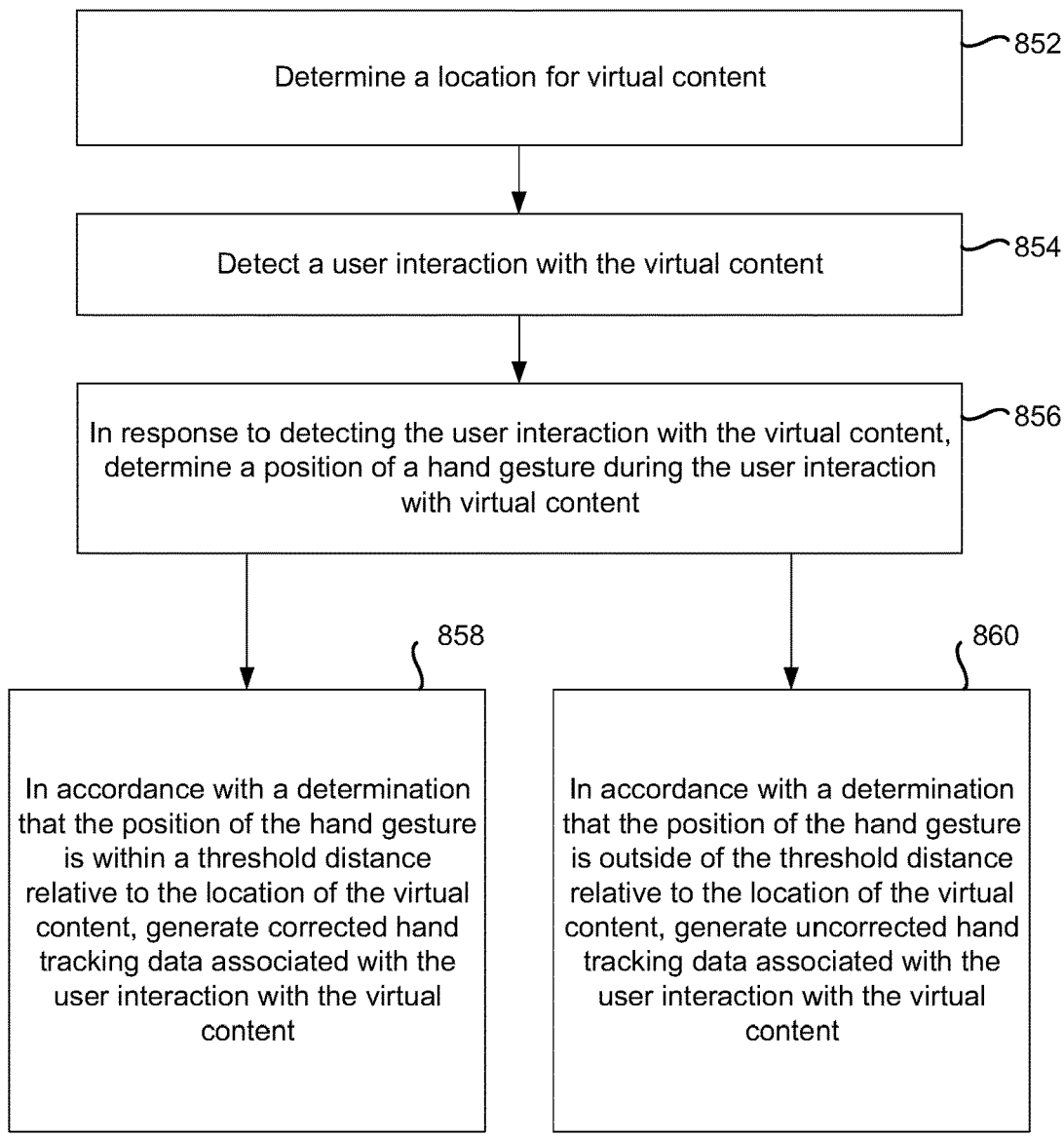
FIG. 8C is a flowchart representation of another method of improved hand tracking in accordance with some implementations.

FIG. 8C is a flowchart representation of a method 850 of improved hand tracking in accordance with some implementations. In various implementations, the method 850 is performed at a computing system including non-transitory memory and one or more processors, wherein the computing system is communicatively coupled to a display device and one or more input devices via a communication interface (e.g., the controller 110 in FIGS. 1 and 9, the electronic device 120 in FIGS. 1 and 10, or a combination thereof). In some implementations, the method 850 is performed by processing logic, including hardware, firmware, software, or a combination thereof. In some implementations, the method 850 is performed by a processor executing code stored in a non-transitory computer-readable medium (e.g., a memory). In some implementations, the computing system corresponds to one of a tablet, a laptop, a mobile phone, a near-eye system, a wearable computing device, or the like.

As represented by block 852, the method 850 includes determining a location for virtual content. For example, with reference to FIG. 7, the content delivery architecture 700 or a component thereof (e.g., the content manager 730) determines a location for virtual content (e.g., an XR object) relative to an XR environment or relative to the physical environment 105.

As represented by block 854, the method 850 includes detecting a user interaction with the virtual content. For example, with reference to FIG. 5A, the content delivery architecture 700 or a component thereof (e.g., the interaction handler 704) detects one or more user inputs 683 that correspond to a user interaction with the virtual content.

As represented by block 856, in response to detecting the user interaction with the virtual content, the method 850 includes determining a position of a hand gesture during the user interaction with virtual content. For example, with reference to FIG. 7, the content delivery architecture 700 or a component thereof (e.g., the hand tracking POV correction engine 702) determines a position of a hand gesture during the user interaction with virtual content based on the hand tracking vector 511.

As represented by block 858, in accordance with a determination that the position of the hand gesture is within a threshold distance relative to the location of the virtual content, the method 850 includes generating corrected hand tracking data associated with the user interaction with the virtual content. In some implementations, in accordance with a determination that the position of the hand gesture is within a threshold distance relative to the location of the virtual content, the user interaction with the virtual content corresponds to a direct interaction type and the user interaction corresponds to a hand tracking input relative to the virtual object. In some implementations, the threshold distance corresponds to a deterministic value such as an X pixel radius relative to the vertical content, a Y cm radius relative to the vertical content, or the like. In some implementations, the threshold distance corresponds to a non-deterministic value determined based on characteristics of the virtual content, user preferences, user interaction history, contextual information (e.g., current user motion state, current environment state, etc.), and/or the like.

For example, the direct interaction type (also referred to herein as the "direct input type") corresponds to a direct user interaction with XR content such as making direct contact to tap a button on a user interface, picking up a virtual stuffed animal, translating a virtual racecar, rotating a virtual globe, or the like with his/her hands. As shown in FIG. 6D, in accordance with a determination that the one or more user inputs 683 correspond to a direct input type, the multiplexer 686 selects the input from the upsampler 682A as the output hand tracking data 657 (e.g., the corrected hand tracking data).

As represented by block 860, in accordance with a determination that the position of the hand gesture is outside of the threshold distance relative to the location of the virtual content, the method 850 includes generating uncorrected hand tracking data associated with the user interaction with the virtual content. In accordance with a determination that the position of the hand gesture is outside of the threshold distance relative to the location of the virtual content, the user interaction with the virtual content corresponds to an indirect interaction type and the user interaction corresponds to one of an eye tracking input, a voice input, or a gestural input relative to the virtual object.

For example, the indirect interaction type (also referred to herein as the "indirect input type") corresponds to pinching and dragging XR content when hands are positioned away from the XR content, selecting an affordance from a menu, voice inputs, hand gesture linked to an action, or the like. As shown in FIG. 6D, in accordance with a determination that the one or more user inputs 683 correspond to correspond to an indirect input type, the multiplexer 686 selects the input from the upsampler 682B as the output hand tracking data 657 (e.g., the uncorrected hand tracking data).

According to some implementations, as described above with reference to the method 800, generating corrected hand tracking data associated with the user interaction with the virtual content includes: obtaining uncorrected hand tracking data associated with a current time period and uncorrected hand tracking data associated with a previous time period; obtaining corrected hand tracking data associated with the current time period; generating differential hand tracking data by performing a difference between the corrected hand tracking data associated with the current time period and the uncorrected hand tracking data associated with the previous time period; generating temporally smoothed differential hand tracking data by performing temporal smoothing on the differential hand tracking data based on a depth map of a physical environment for the current time period; and generating output hand tracking data by performing a difference between the temporally smoothed differential hand tracking data and the uncorrected hand tracking data associated with the current time period, wherein the output hand tracking data corresponds to the corrected hand tracking data associated with the user interaction with the virtual content In some implementations, obtaining the corrected hand tracking data associated with the current time period includes: obtaining a first set of two-dimensional coordinates of a hand of the user in a physical environment; and transforming the first set of two-dimensional coordinates into a second set of two-dimensional coordinates based on a depth map of the physical environment.

In some implementations, the first set of two-dimensional coordinates are generated by projecting first three-dimensional coordinates onto an image plane. In some implementations, the first set of two-dimensional coordinates includes a left set and a right set used for triangulation. In some implementations, a second set of three-dimensional coordinates is generated from the second set of two-dimensional coordinates.

In some implementations, the method 850 includes: rendering the user interaction with the virtual content based on the output hand tracking data; and displaying, via the display device, the rendered user interaction with the virtual content based on the output hand tracking data. As one example, with reference to FIG. 7, the content delivery architecture 700 or a component thereof (e.g., the content manager 730) updates XR environment to include the user interaction with the virtual content based on the corrected hand tracking data (e.g., the output hand tracking data) when the user interaction corresponds to the direct input type. As another example, with reference to FIG. 7, the content delivery architecture 700 or a component thereof (e.g., the content manager 730) updates XR environment to include the user interaction with the virtual content based on the uncorrected hand tracking data (e.g., the output hand tracking data) when the user interaction corresponds to the indirect input type.

Figure 9:
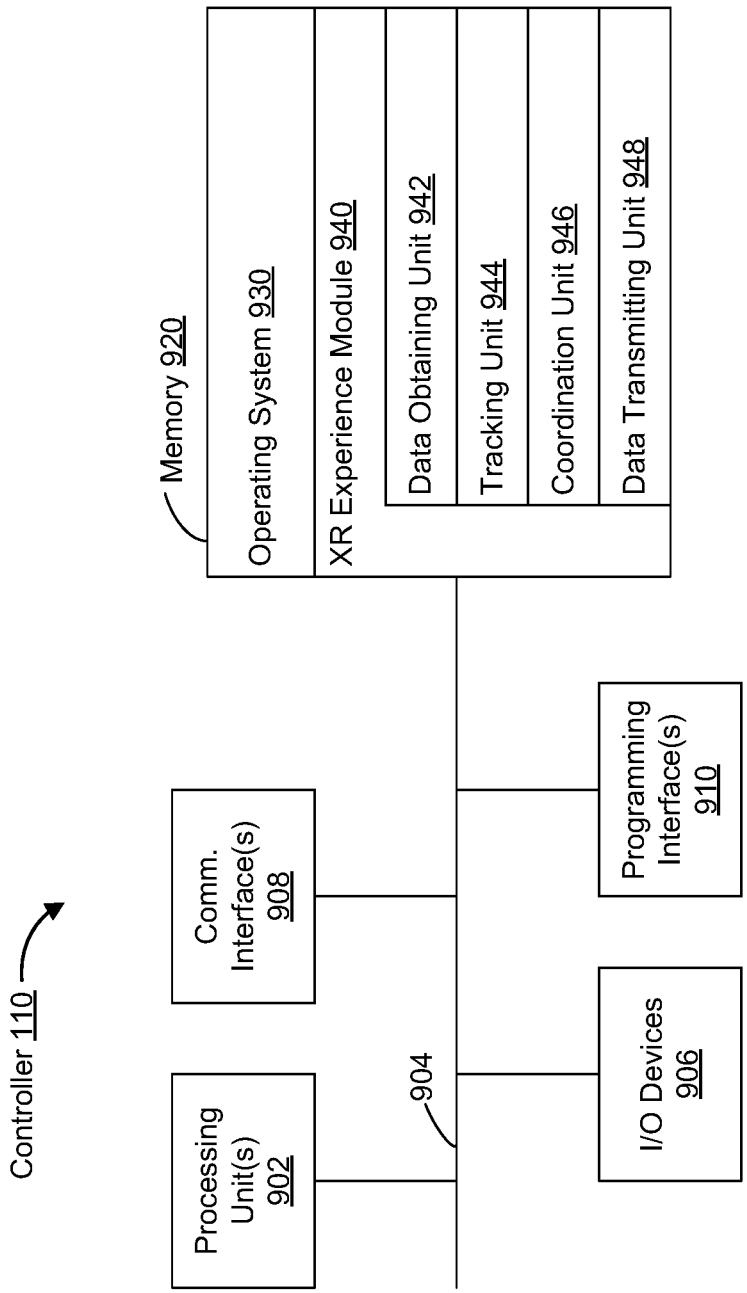
FIG. 9 is a block diagram of an example controller in accordance with some implementations.

FIG. 9 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 902 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 906, one or more communication interfaces 908 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 910, a memory 920, and one or more communication buses 904 for interconnecting these and various other components.

In some implementations, the one or more communication buses 904 include circuitry that interconnects and controls communications between system components. In some implementations, the one or more I/O devices 906 include at least one of a keyboard, a mouse, a touchpad, a joystick, one or more microphones, one or more speakers, one or more image sensors, one or more displays, and/or the like.

The memory 920 includes high-speed random-access memory, such as dynamic random-access memory (DRAM), static random-access memory (SRAM), double-data-rate random-access memory (DDR RAM), or other random-access solid-state memory devices. In some implementations, the memory 920 includes non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 comprises a non-transitory computer readable storage medium. In some implementations, the memory 920 or the non-transitory computer readable storage medium of the memory 920 stores the following programs, modules and data structures, or a subset thereof including an optional operating system 930 and an XR experience module 940.

The operating system 930 includes procedures for handling various basic system services and for performing hardware dependent tasks. In some implementations, the XR experience module 940 is configured to manage and coordinate one or more XR experiences for one or more users (e.g., a single XR experience for one or more users, or multiple XR experiences for respective groups of one or more users). To that end, in various implementations, the XR experience module 940 includes a data obtaining unit 942, a tracking unit 944, a coordination unit 946, and a data transmitting unit 948.

In some implementations, the data obtaining unit 942 is configured to obtain data (e.g., presentation data, interaction data, sensor data, location data, etc.) from at least the electronic device 120 of FIG. 1. To that end, in various implementations, the data obtaining unit 942 includes instructions and/or logic therefor, and heuristics and metadata therefor.

In some implementations, the tracking unit 944 is configured to map the physical environment 105 and to track the position/location of at least the electronic device 120 with respect to the physical environment 105 of FIG. 1. To that end, in various implementations, the tracking unit 944 includes instructions and/or logic therefor, and heuristics and metadata therefor.

In some implementations, the coordination unit 946 is configured to manage and coordinate the XR experience presented to the user by the electronic device 120. To that end, in various implementations, the coordination unit 946 includes instructions and/or logic therefor, and heuristics and metadata therefor.

In some implementations, the data transmitting unit 948 is configured to transmit data (e.g., presentation data, location data, etc.) to at least the electronic device 120. To that end, in various implementations, the data transmitting unit 948 includes instructions and/or logic therefor, and heuristics and metadata therefor.

Although the data obtaining unit 942, the tracking unit 944, the coordination unit 946, and the data transmitting unit 948 are shown as residing on a single device (e.g., the controller 110), it should be understood that in other implementations, any combination of the data obtaining unit 942, the tracking unit 944, the coordination unit 946, and the data transmitting unit 948 may be located in separate computing devices.

Moreover, FIG. 9 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 9) could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 10:
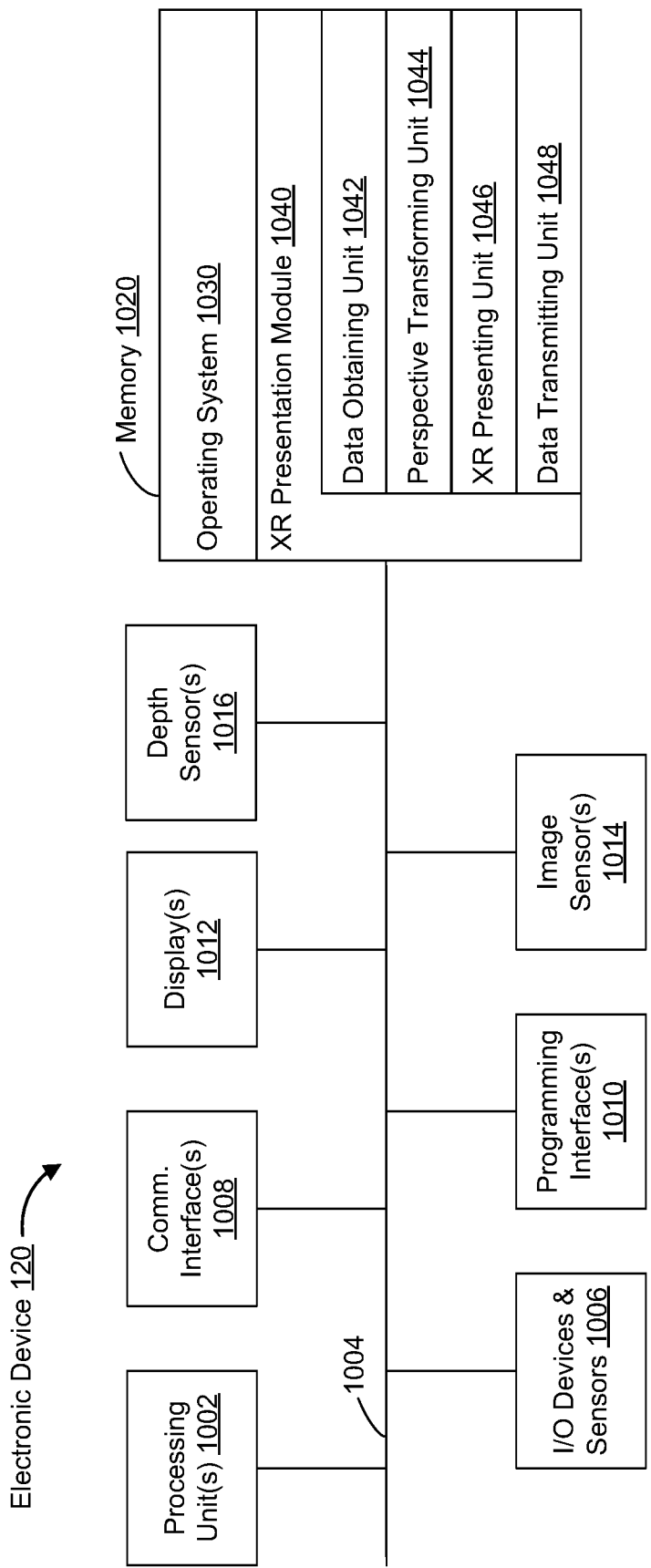
FIG. 10 is a block diagram of an example electronic device in accordance with some implementations.

FIG. 10 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 1002 (e.g., microprocessors, ASICs, FPGAs, GPUs, CPUs, processing cores, and/or the like), one or more input/output (I/O) devices and sensors 1006, one or more communication interfaces 1008 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 1010, one or more displays 1012, one or more optional interior- and/or exterior-facing image sensors 1014, one or more optional depth sensors 1016, a memory 1020, and one or more communication buses 1004 for interconnecting these and various other components.

In some implementations, the one or more communication buses 1004 include circuitry that interconnects and controls communications between system components. In some implementations, the one or more I/O devices and sensors 1006 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, and/or the like.

In some implementations, the one or more displays 1012 are configured to provide the user interface or the XR experience to the user. In some implementations, the one or more displays 1012 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 1012 correspond to diffractive, reflective, polarized, holographic, etc. waveguide displays. For example, the electronic device 120 includes a single display. In another example, the electronic device includes a display for each eye of the user. In some implementations, the one or more displays 1012 are capable of presenting MR and VR content.

In some implementations, the one or more image sensors 1014 are configured to obtain image data that corresponds to at least a portion of the face of the user that includes the eyes of the user (any may be referred to as an eye-tracking camera). In some implementations, the one or more image sensors 1014 are configured to be forward-facing so as to obtain image data that corresponds to the physical environment as would be viewed by the user if the electronic device 120 was not present (and may be referred to as a scene camera). The one or more optional image sensors 1014 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like. In some implementations, the one or more optional depth sensors 1016 correspond to a structured light device, a time-of-flight device, and/or the like.

The memory 1020 includes high-speed random-access memory, such as DRAM, SRAM, DDR RAM, or other random-access solid-state memory devices. In some implementations, the memory 1020 includes non-volatile memory, such as one or more magnetic disk storage devices, optical disk storage devices, flash memory devices, or other non-volatile solid-state storage devices. The memory 1020 optionally includes one or more storage devices remotely located from the one or more processing units 1002. The memory 1020 comprises a non-transitory computer readable storage medium. In some implementations, the memory 1020 or the non-transitory computer readable storage medium of the memory 1020 stores the following programs, modules and data structures, or a subset thereof including an optional operating system 1030 and an XR presentation module 1040.

The operating system 1030 includes procedures for handling various basic system services and for performing hardware dependent tasks. In some implementations, the XR presentation module 1040 is configured to present XR content to the user via the one or more displays 1012. To that end, in various implementations, the XR presentation module 1040 includes a data obtaining unit 1042, a perspective transforming unit 1044, an XR presenting unit 1046, and a data transmitting unit 1048.

In some implementations, the data obtaining unit 1042 is configured to obtain data (e.g., presentation data, interaction data, sensor data, location data, etc.) from at least the controller 110 of FIG. 1. To that end, in various implementations, the data obtaining unit 1042 includes instructions and/or logic therefor, and heuristics and metadata therefor.

In some implementations, the perspective transforming unit 1044 is configured to perform perspective correction (e.g., POV correction) on an image stream from a scene camera by transforming a camera set of two-dimensional coordinates (e.g., associated with an image space/plane) into a display set of two-dimensional coordinates (e.g., associated with a display space/plane).

In various implementations, the perspective transforming unit 1044 is configured to perform perspective correction (e.g., POV correction) on hand tracking data according to at least some of the functions of the temporally-differential depth smoothing architecture 650 described above with reference to FIG. 6C. According to some implementations, the perspective transforming unit 1044 is configured to perform perspective correction (e.g., POV correction) on hand tracking data according to at least some of the functions of the heuristic-based temporally-differential depth smoothing architecture 680 described above with reference to FIG. 6D. To that end, in various implementations, the perspective transforming unit 1044 includes instructions and/or logic therefor, and heuristics and metadata therefor.

In some implementations, the XR presenting unit 1046 is configured to display the transformed image via the one or more displays 1012. To that end, in various implementations, the XR presenting unit 1046 includes instructions and/or logic therefor, and heuristics and metadata therefor.

In some implementations, the data transmitting unit 1048 is configured to transmit data (e.g., presentation data, location data, etc.) to at least the controller 110. To that end, in various implementations, the data transmitting unit 1048 includes instructions and/or logic therefor, and heuristics and metadata therefor.

Although the data obtaining unit 1042, the perspective transforming unit 1044, the XR presenting unit 1046, and the data transmitting unit 1048 are shown as residing on a single device (e.g., the electronic device 120), it should be understood that in other implementations, any combination of the data obtaining unit 1042, the perspective transforming unit 1044, the XR presenting unit 1046, and the data transmitting unit 1048 may be located in separate computing devices.

Moreover, FIG. 10) is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 10 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a computing system including non-transitory memory and one or more processors, wherein the computing system is communicatively coupled to a display device and one or more input devices via a communication interface:
   determining a location for virtual content;
   detecting a user interaction with the virtual content;
   in response to detecting the user interaction with the virtual content, determining a position of a hand gesture during the user interaction with the virtual content;
   in accordance with a determination that the position of the hand gesture is within a threshold distance relative to the location of the virtual content, generating corrected hand tracking data associated with the user interaction with the virtual content and corresponding to a direct interaction with the virtual content; and
   in accordance with a determination that the position of the hand gesture is outside of the threshold distance relative to the location of the virtual content, generating uncorrected hand tracking data associated with the user interaction with the virtual content and corresponding to an indirect interaction with the virtual content.

2. The method of claim 1, wherein generating corrected hand tracking data associated with the user interaction with the virtual content includes:
   obtaining uncorrected hand tracking data associated with a current time period and uncorrected hand tracking data associated with a previous time period;
   obtaining corrected hand tracking data associated with the current time period;
   generating differential hand tracking data by performing a difference between the corrected hand tracking data associated with the current time period and the uncorrected hand tracking data associated with the previous time period;
   generating temporally smoothed differential hand tracking data by performing temporal smoothing on the differential hand tracking data based on a depth map of a physical environment for the current time period; and
   generating output hand tracking data by performing a difference between the temporally smoothed differential hand tracking data and the uncorrected hand tracking data associated with the current time period, wherein the output hand tracking data corresponds to the corrected hand tracking data associated with the user interaction with the virtual content.

3. The method of claim 2, wherein obtaining the corrected hand tracking data associated with the current time period includes:
   obtaining a first set of two-dimensional coordinates of a hand of the user in a physical environment; and
   transforming the first set of two-dimensional coordinates into a second set of two-dimensional coordinates based on a depth map of the physical environment.

4. The method of claim 3, wherein the first set of two-dimensional coordinates are generated by projecting first three-dimensional coordinates onto an image plane.

5. The method of claim 4, wherein the first set of two-dimensional coordinates includes a left set and a right set used for triangulation.

6. The method of claim 4, wherein a second set of three-dimensional coordinates is generated from the second set of two-dimensional coordinates.

7. The method of claim 2, further comprising:
   rendering the user interaction with the virtual content based on the output hand tracking data; and displaying, via the display device, the rendered user interaction with the virtual content based on the output hand tracking data.

8. The method of claim 1, wherein, in accordance with a determination that the position of the hand gesture is within a threshold distance relative to the location of the virtual content, the user interaction with the virtual content corresponds to a direct interaction type and the user interaction corresponds to a hand tracking input relative to the virtual object.

9. The method of claim 1, wherein, in accordance with a determination that the position of the hand gesture is outside of the threshold distance relative to the location of the virtual content, the user interaction with the virtual content corresponds to an indirect interaction type and the user interaction corresponds to one of an eye tracking input, a voice input, or a gestural input relative to the virtual object.

10. A computing system comprising:
one or more processors;
a non-transitory memory;
an interface for communicating with a display device and one or more input devices; and
one or more programs stored in the non-transitory memory, which, when executed by the one or more processors, cause the computing system to:
determine a location for virtual content;
detect a user interaction with the virtual content;
in response to detecting the user interaction with the virtual content, determine a position of a hand gesture during the user interaction with the virtual content;
in accordance with a determination that the position of the hand gesture is within a threshold distance relative to the location of the virtual content, generate corrected hand tracking data associated with the user interaction with the virtual content and corresponding to a direct interaction with the virtual content; and
in accordance with a determination that the position of the hand gesture is outside of the threshold distance relative to the location of the virtual content, generate uncorrected hand tracking data associated with the user interaction with the virtual content and corresponding to an indirect interaction with the virtual content.

11. The computing system of claim 10, wherein generating corrected hand tracking data associated with the user interaction with the virtual content includes:
obtaining uncorrected hand tracking data associated with a current time period and uncorrected hand tracking data associated with a previous time period;
obtaining corrected hand tracking data associated with the current time period;
generating differential hand tracking data by performing a difference between the corrected hand tracking data associated with the current time period and the uncorrected hand tracking data associated with the previous time period;
generating temporally smoothed differential hand tracking data by performing temporal smoothing on the differential hand tracking data based on a depth map of a physical environment for the current time period; and
generating output hand tracking data by performing a difference between the temporally smoothed differential hand tracking data and the uncorrected hand tracking data associated with the current time period, wherein the output hand tracking data corresponds to the corrected hand tracking data associated with the user interaction with the virtual content.

12. The computing system of claim 11, wherein obtaining the corrected hand tracking data associated with the current time period includes:
obtaining a first set of two-dimensional coordinates of a hand of the user in a physical environment; and
transforming the first set of two-dimensional coordinates into a second set of two-dimensional coordinates based on a depth map of the physical environment.

13. The computing system of claim 10, wherein, in accordance with a determination that the position of the hand gesture is within a threshold distance relative to the location of the virtual content, the user interaction with the virtual content corresponds to a direct interaction type and the user interaction corresponds to a hand tracking input relative to the virtual object.

14. The computing system of claim 10, wherein, in accordance with a determination that the position of the hand gesture is outside of the threshold distance relative to the location of the virtual content, the user interaction with the virtual content corresponds to an indirect interaction type and the user interaction corresponds to one of an eye tracking input, a voice input, or a gestural input relative to the virtual object.

15. A non-transitory memory storing one or more programs, which, when executed by one or more processors of a computing system with an interface for communicating with a display device and one or more input devices, cause the computing system to:
determine a location for virtual content;
detect a user interaction with the virtual content;
in response to detecting the user interaction with the virtual content, determine a position of a hand gesture during the user interaction with the virtual content;
in accordance with a determination that the position of the hand gesture is within a threshold distance relative to the location of the virtual content, generate corrected hand tracking data associated with the user interaction with the virtual content and corresponding to a direct interaction with the virtual content; and
in accordance with a determination that the position of the hand gesture is outside of the threshold distance relative to the location of the virtual content, generate uncorrected hand tracking data associated with the user interaction with the virtual content and corresponding to an indirect interaction with the virtual content.

16. The non-transitory memory of claim 15, wherein generating corrected hand tracking data associated with the user interaction with the virtual content includes:
obtaining uncorrected hand tracking data associated with a current time period and uncorrected hand tracking data associated with a previous time period;
obtaining corrected hand tracking data associated with the current time period;
generating differential hand tracking data by performing a difference between the corrected hand tracking data associated with the current time period and the uncorrected hand tracking data associated with the previous time period;
generating temporally smoothed differential hand tracking data by performing temporal smoothing on the differential hand tracking data based on a depth map of a physical environment for the current time period; and
generating output hand tracking data by performing a difference between the temporally smoothed differential hand tracking data and the uncorrected hand tracking data associated with the current time period, wherein the output hand tracking data corresponds to the corrected hand tracking data associated with the user interaction with the virtual content.

17. The non-transitory memory of claim 16, wherein obtaining the corrected hand tracking data associated with the current time period includes:
   obtaining a first set of two-dimensional coordinates of a hand of the user in a physical environment; and
   transforming the first set of two-dimensional coordinates into a second set of two-dimensional coordinates based on a depth map of the physical environment.

18. The non-transitory memory of claim 16, wherein the one or more programs further cause the computing system to:
   render the user interaction with the virtual content based on the output hand tracking data; and
   display, via the display device, the rendered user interaction with the virtual content based on the output hand tracking data.

19. The non-transitory memory of claim 15, wherein, in accordance with a determination that the position of the hand gesture is within a threshold distance relative to the location of the virtual content, the user interaction with the virtual content corresponds to a direct interaction type and the user interaction corresponds to a hand tracking input relative to the virtual object.

20. The non-transitory memory of claim 15, wherein, in accordance with a determination that the position of the hand gesture is outside of the threshold distance relative to the location of the virtual content, the user interaction with the virtual content corresponds to an indirect interaction type and the user interaction corresponds to one of an eye tracking.

* * * * *